US008243055B2

(12) United States Patent
Abe

(10) Patent No.: US 8,243,055 B2
(45) Date of Patent: Aug. 14, 2012

(54) LIGHT-EMITTING DISPLAY DEVICE

(75) Inventor: Katsumi Abe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 528 days.

(21) Appl. No.: 12/516,456

(22) PCT Filed: Dec. 12, 2007

(86) PCT No.: PCT/JP2007/074365

§ 371 (c)(1),
(2), (4) Date: May 27, 2009

(87) PCT Pub. No.: WO2008/075697

PCT Pub. Date: Jun. 26, 2008

(65) Prior Publication Data

US 2010/0001983 A1 Jan. 7, 2010

(30) Foreign Application Priority Data

Dec. 20, 2006 (JP) ................................ 2006-342578

(51) Int. Cl.
*G06F 3/038* (2006.01)

(52) U.S. Cl. ............................ 345/211; 345/76; 345/82

(58) Field of Classification Search .................... 345/76, 345/211, 40
See application file for complete search history.

(56) References Cited

U.S. PATENT DOCUMENTS 6,373,454 B1 4/2002 Knapp et al. .................... 345/76
6,501,466 B1 12/2002 Yamagishi et al. ........... 345/204
7,508,362 B2 3/2009 Ozawa et al.
7,561,128 B2 7/2009 Ahn et al.
7,855,701 B2 12/2010 Yoo (Continued)

FOREIGN PATENT DOCUMENTS

CN 1558390 A 12/2004

(Continued)

OTHER PUBLICATIONS

Chinese Office Action dated Aug. 31, 2011, in related Chinese Patent Application No. 200780047263.6 (with English translation).

(Continued)

*Primary Examiner* — William Boddie
*Assistant Examiner* — Towfiq Elahi
(74) *Attorney, Agent, or Firm* — Fitzpatrick, Cella, Harper & Scinto

(57) ABSTRACT

A light-emitting display device includes multiple pixels, with each pixel including a light-emitting element and a drive circuit for supplying the current to the light-emitting element based on a control voltage supplied from a data line. In a light-emitting period, one end of a capacitor element is connected with a source terminal by a second switch element, and the drive circuit supplies a current to the light-emitting element. In a current setting period prior to the light-emitting period, during which a gate terminal is connected with the source terminal by a first switch element and the one end of the capacitor element is connected with the data line by a third switch element, the source terminal is once connected with a reference voltage line having a voltage higher than a voltage of a drain terminal, and thereafter the source terminal is disconnected from the reference voltage line to render the voltage between the gate terminal and the drain terminal equal to a threshold voltage of a driving transistor.

9 Claims, 8 Drawing Sheets

U.S. PATENT DOCUMENTS

| | | | | |
|---|---|---|---|---|
| 2004/0174354 | A1* | 9/2004 | Ono et al. | 345/204 |
| 2005/0088378 | A1* | 4/2005 | Ozawa et al. | 345/76 |
| 2006/0139253 | A1* | 6/2006 | Choi et al. | 345/76 |
| 2006/0170628 | A1* | 8/2006 | Yamashita et al. | 345/76 |
| 2006/0231740 | A1* | 10/2006 | Kasai | 250/214.1 |
| 2006/0237716 | A1* | 10/2006 | Sezi et al. | 257/40 |
| 2006/0267035 | A1* | 11/2006 | Yamanaka et al. | 257/97 |
| 2006/0292394 | A1* | 12/2006 | Iwaki et al. | 428/690 |
| 2009/0021536 | A1 | 1/2009 | Abe et al. | 345/690 |

FOREIGN PATENT DOCUMENTS

| | | | |
|---|---|---|---|
| CN | 1598913 | A | 3/2005 |
| CN | 1787057 | A | 6/2006 |
| CN | 1855198 | A | 11/2006 |
| JP | 2004-93777 | | 3/2004 |
| JP | 2005-189379 | | 7/2005 |
| KR | 10-2007-0116389 | A | 12/2007 |

OTHER PUBLICATIONS

Korean Office Action dated Sep. 30, 2011, in related Korean Patent Application No. 10-2009-7014962.

International Search Report and Written Opinion in PCT/JP2007/074365.

Jae-Hoon Lee, "P-12: A New a-Si: H TFT pixel Design Compensating Threshold Voltage Degradation of TFT and OLED," 2004, SID International Symposium. Seattle, WA, May 25-27, 2004, SID International Symposium, San Jose, CA: SID US, May 25, 2004, pp. 264-267 XP007012052.

J.H. Jung, et al., "49.1: A 14.1 inch Full Color AMOLED Display with Top Emission Structure and a-Si TFT Backplane," SID 05 Digest, 2005, pp. 1538-1541.

Chinese Office Action dated May 30, 2012, in related Chinese Application No. 200780047263.6 (with English translation).

* cited by examiner

LIGHT-EMITTING DISPLAY DEVICE

TECHNICAL FIELD

The present invention relates to a light-emitting display device, and particularly, to a light-emitting display device using an organic light-emitting diode (hereinafter, referred to as OLED) element as a light-emitting element. More particularly, the present invention relates to a light-emitting display device in which pixels each including the OLED element and a drive circuit for supplying a current thereto are arranged in matrix.

BACKGROUND ART

Up to now, an active matrix (hereinafter, referred to as AM) OLED display has been studied as a light-emitting display device in which pixels each including an OLED element and a drive circuit are arranged in matrix. This example is illustrated in FIGS. 8 and 9.

FIGS. 8 and 9 illustrate an internal structure of a pixel of the AM OLED display and a pixel arrangement thereof, respectively. As illustrated in FIG. 8, a pixel 10 includes an OLED and a drive circuit 11 having an active element connected with an anode terminal thereof. The drive circuit 11 is connected with a data line DL and a scanning line SL. This example in the figure illustrates the case where one scanning line SL is provided. As illustrated in FIG. 9, multiple pixels, each of which is the pixel 10 including the OLED and the drive circuit 11, are arranged in matrix (m rows×n columns) and connected with first to m-th scanning lines SL1 to SLm and first to nth data lines DL1 to DLn.

According to the AM OLED display having the structure as described above, a voltage, a current, or the like which is supplied to an OLED element is controlled by an active element of a drive circuit based on a voltage or current signal applied to the drive circuit of a pixel through a data line. Therefore, the luminance of the OLED element is adjusted for gradation display. A thin film transistor (TFT) is normally used as the active element which is a constituent element of the drive circuit.

In the AM OLED display, there is a problem of a temporal change in voltage-luminance characteristic of the OLED element. Also, there are problems in that variations in characteristics of the TFTs and changes in characteristics of the TFT due to electrical stress occur. In the case where the characteristics change or vary as described above, even when the same signal is applied to the drive circuit from the data line, the luminance of the OLED element changes. Therefore, display unevenness, a bright point, a dark point, or the like appears. Thus, in order to realize high-quality displays, it is necessary to develop a drive circuit and a driving method which are resistant to the temporal change in characteristic of the OLED element and the variations and changes in characteristics of the TFT.

In order to solve the problems of the drive circuit, conventional techniques have been proposed in U.S. Pat. No. 6,373,454 and U.S. Pat. No. 6,501,466.

According to U.S. Pat. No. 6,373,454, a current corresponding to light-emitting luminance of an OLED element is supplied from the outside of a pixel to a driver (p-type) TFT for supplying a current to the OLED element to hold a voltage between a gate terminal and a source terminal between which the current flows. Then, the current determined based on the held voltage between the gate terminal and the source terminal is supplied to the OLED element through the TFT, so the OLED element emits light. In this example, the voltage between the gate terminal and the source terminal between which the current corresponding to light-emitting luminance flows is held and the TFT acts as a constant current source. Therefore, even when the characteristics of the driving TFT vary, the current supplied to the OLED element does not vary.

According to U.S. Pat. No. 6,501,466, one of two TFTs forming a current mirror structure is a driver (p-type) TFT for supplying a current to an OLED element and the other thereof is a load (p-type) TFT to which a current corresponding to light-emitting luminance of the OLED element is supplied from the outside of a pixel. The current is supplied from the outside of the pixel to hold a voltage between a gate terminal and a source terminal which corresponds to the current flowing into the load TFT. Then, the current determined based on the held voltage between the gate terminal and the source terminal is supplied from the driving TFT to the OLED element, so the OLED element emits light. Even when the characteristics of the TFTs vary depending on positions, the driving TFT and the load TFT are located close to each other and exhibit the same characteristic, so the current supplied to the OLED element does not vary as in the case of U.S. Pat. No. 6,373,454.

A semiconductor such as polycrystal silicon (hereinafter, referred to as p-Si), amorphous silicon (hereinafter, referred to as a-Si), an organic semiconductor (hereinafter, referred to as OS), or a metal oxide semiconductor has been studied as a material for a channel layer of the TFT.

A p-Si TFT has high mobility, so an operating voltage thereof can be reduced. However, because of crystal grain boundary, variations in characteristics are more likely to increase and a manufacturing cost becomes larger. On the other hand, an a-Si or OS TFT has lower mobility than the p-Si TFT, so the operating voltage is high and thus power consumption is large. However, the number of manufacturing steps is small, so the manufacturing cost can be suppressed. In recent years, a TFT using a metal oxide semiconductor such as zinc oxide (ZnO) for a channel layer has been under development and it has been reported that the TFT may have higher mobility and lower cost than those of the a-Si and OS TFTs.

Unlike the p-Si TFT, it is difficult to use the a-Si, OS, or metal oxide semiconductor TFT for a complementary TFT in which an n-type TFT and a p-type TFT are formed on the same substrate. For example, in the case of a-Si or metal oxide, a high-mobility p-type semiconductor is not obtained, so it is difficult to form the p-type TFT. In the case of OS, because a high-mobility n-type semiconductor material is different from a high-mobility p-type semiconductor material, the number of steps is doubled, so low-cost manufacturing is difficult to achieve. Therefore, it is necessary to use only the n-type or p-type TFT for the drive circuit using the TFTs.

In the TFT whose channel layer is made of one of a-Si, OS, and metal oxide, a current-voltage characteristic thereof is changed by the application of a voltage for a long time, so it is necessary to compensate for the change by any method.

On the other hand, the OLED element normally has a structure in which at least a light-emitting layer made of an organic material is sandwiched between an anode electrode and a cathode electrode. It is more likely to change characteristics of the organic material by the influence of heat, an electromagnetic wave, or moisture. Therefore, a manufacturing process for forming the organic material light-emitting layer after the formation of the drive circuit and the anode electrode and then forming the cathode electrode by vacuum vapor deposition with less damage is preferably used for a light-emitting display device using the OLED element.

Then, assume that a pixel of the AM OLED display includes the drive circuit having the n-type TFT and the OLED element having the anode electrode, the organic light-emitting layer, and the cathode electrode which are formed in the stated order from the lower side. In such a case, the display cannot be realized by only replacing the p-type TFT of the drive circuit described in U.S. Pat. No. 6,373,454 or 6,501,466 with the n-type TFT. This is because, when the p-type TFT is replaced with the n-type TFT in U.S. Pat. No. 6,373,454 or U.S. Pat. No. 6,501,466, a voltage between the gate terminal and a drain terminal is fixed, so the TFT doe not act as the constant current source. Therefore, it is necessary to employ a drive circuit structure different from that in U.S. Pat. No. 6,373,454 or U.S. Pat. No. 6,501,466.

A drive circuit proposed in FIG. 2 of Japanese Patent Application Laid-open No. 2004-093777 includes only n-type TFTs. This is a technique for suppressing the influence of variations in characteristics and the influence of changes in characteristics. The drive circuit includes a capacitor provided between a gate terminal and a source terminal of an n-type TFT (driving TFT) for driving an OLED element. For a period in which a current for driving the OLED element is set, a gate terminal and a drain terminal of a TFT are electrically connected with each other to cut off a path to the OLED element and supply a current from the outside. At this time, a voltage between the gate terminal and a source terminal corresponds to a voltage (set voltage) when the current supplied from the outside flows. For a period in which the OLED element is driven, the n-type TFT acts as a constant current source for supplying the current to the OLED element based on the set voltage.

In recent years, a current-luminance characteristic of the OLED element has been improved to reduce a current supplied to the OLED element. A large-size and high-definition OLED display is required, so it tends to increase a line load. Therefore, when a low current corresponding to low gradation is supplied from the outside in Japanese Patent Application Laid-open No. 2004-093777, a time for charging the line load becomes longer. Thus, it is difficult to apply the drive circuit described in Japanese Patent Application Laid-open No. 2004-093777 to a high-definition and large-screen display device.

For example, assume that a capacitance and a resistance of the line load of a large-screen display device are 40 pF and 5 kΩ (time constant is 0.2 μsec.), respectively, and a variation in voltage which is required to set the current supplied from the outside is 3 V. In this case, the amount of charge to be stored is 120 pC. When the line load is to be charged with a current of 10 nA corresponding to low gradation, a time of 12 msec. is required. When scanning lines (1250) of a high-definition television are to be driven at 60 Hz, a selection period per scanning line is 13 μsec., so charging is impossible.

A means for solving the above-mentioned problems is proposed in FIG. 1 of Japanese Patent Application Laid-open No. 2004-093777. According to the drive circuit, a charging current can be increased up to approximately ten times larger. In such a case, the charging period can be shortened from 12 msec. to 1.2 msec. However, it is insufficient to use the drive circuit for the high-definition television.

Another means for solving the above-mentioned problems is a drive circuit illustrated in FIG. 1 of Japanese Patent Application Laid-open No. 2005-189379. The drive circuit has a function of correcting a threshold voltage of a driving TFT. In the circuit, a current for driving an OLED element is set based on a voltage from the outside. A setting period is mainly determined based on a charging period of a line load. The time constant of the line load is 0.2 μsec. Therefore, when a period during which 99.8% charging is completed is assumed as the setting period, the period becomes 1.2 μsec which is six times the time constant. Therefore, when this conventional technique is used, a high-definition television can be driven.

However, in this circuit, a voltage applied between a gate terminal and a source terminal of the driving TFT is determined based on a divided voltage obtained by two capacitors provided in the drive circuit. Therefore, in order to realize high-precision driving, it is necessary to provide two capacitors in a pixel to realize a precise capacitance ratio between the capacitors.

Another drive circuit for solving the above-mentioned problems is proposed in J. H. Jung et al., SID 05 DIGEST 49.1, FIG. 1. In this circuit, as in the circuit described in Japanese Patent Application Laid-open No. 2005-189379, the current for driving the OLED element is set based on the voltage from the outside, so the setting period can be shortened. In this circuit, the voltage applied to the gate terminal of the driving TFT is determined by only one of the capacitors and the other of the capacitors is used for only storage, with the result that a variation in ratio between the capacitors does not become a problem.

However, in the circuit, the voltage between the gate terminal and the source terminal of the driving TFT is not fixed. The driving TFT operates not as the constant current source but as a source follower for applying a voltage to the source terminal. A voltage obtained by correcting threshold voltages of the driving TFT and the OLED element is applied to the gate terminal of the driving TFT. Therefore, only when a change in voltage-current characteristic of the OLED element is shifted in parallel relative to the applied voltage, this correction is established.

DISCLOSURE OF THE INVENTION

An object of the present invention is to solve the problems which cannot be solved by the conventional techniques.

That is, an object of the present invention is to provide a light-emitting display device which suppresses the influence of variations and/or changes in characteristics of a driving transistor and the influence of a characteristic shift caused by electrical stress and includes a drive circuit for controlling a current supplied to a light-emitting element.

Another object of the present invention is to provide a drive circuit which includes a single capacitor and has less variation factors.

According to the present invention, there is provided a light-emitting display device, including multiple pixels each including: a light-emitting element which has an anode terminal and a cathode terminal and emits light at a luminance determined based on a current to be supplied; and a drive circuit for supplying the current to the light-emitting element based on a control voltage supplied from a data line. The drive circuit includes: a driving transistor having a gate terminal, a source terminal, and a drain terminal, for driving the light-emitting element; a capacitor element; and multiple switch elements. The source terminal of the driving transistor is connected with the anode terminal of the light-emitting element directly or through the switch elements. When the drive circuit supplies the current to the light-emitting element, one end of the capacitor element is connected with the gate terminal of the driving transistor directly or through the switch elements and the other end of the capacitor element is connected with the source terminal of the driving transistor directly or through the switch elements. Further, the capacitor element and the multiple switch elements set a voltage difference between the gate terminal and the source terminal of the driving transistor equal to a sum of a threshold voltage of the driving transistor and a voltage determined based on a voltage of the drain terminal of the driving transistor during a current setting period and the control voltage supplied from the data line.

According to the present invention, one end of the capacitor element may be connected with the gate terminal of the driving transistor, and the multiple switch elements may include a first switch element for electrically connecting or disconnecting the gate terminal and the source terminal of the driving transistor, a second switch element for electrically connecting or disconnecting the source terminal of the driving transistor and the other end of the capacitor element, and a third switch element for electrically connecting or disconnecting the other end of the capacitor element and a data line to which a voltage signal for controlling a magnitude of the current supplied to the light-emitting element is applied from an outside of a pixel.

Further, one end of the capacitor element may be connected with the source terminal of the driving transistor, and the multiple switch elements may include: a first switch whose one end is connected with the gate terminal of the driving transistor and the other end is connected with the drain terminal of the driving transistor; a second switch whose one end is connected with the gate terminal of the driving transistor and the other end is connected with the other end of the capacitor element; and a third switch whose one end is connected with the above other end of the second switch element and the other end is connected with a data line to which a voltage corresponding to graduation is applied.

According to the present invention, the drive circuit provided in the pixel of the light-emitting display device can set the current supplied to the light-emitting element without depending on the threshold voltage of the driving transistor.

According to the present invention, the number of capacitor elements included in the drive circuit is one. When the capacitance value of the capacitor element is sufficiently larger than the total parasitic capacitance of other elements of the drive circuit, the current supplied to the light-emitting element does not depend on the capacitor element.

According to the present invention, when current is to be supplied to the light-emitting element, both ends of the capacitor element are respectively connected with the gate terminal and the source terminal of the driving transistor. Therefore, the driving transistor operates as a constant current source in a saturation region without depending on characteristics of the light-emitting element.

According to the present invention, the current supplied to the light-emitting element is set based on the voltage, so the present invention can be applied to a large-size and high-definition light-emitting display device whose line load is large.

According to the present invention, a structure can be employed in which the drive circuit includes only n-type TFTs, the anode of the light-emitting element is provided on the drive circuit side, and an anode electrode, a light-emitting layer, and a cathode electrode are layered in the stated order from the lower side.

According to the present invention, an n-type TFT whose channel layer is a metal oxide semiconductor layer having a carrier density equal to or smaller than $10^{18}$ ($cm^{-3}$), a field effect mobility equal to or larger than 1 ($cm^2/Vs$), and an on/off ratio equal to or larger than $10^6$ is used as the n-type TFT. Therefore, as compared with the case of a structure using the a-Si or OS TFT, it is possible to produce a light-emitting display device using a TFT which has low power consumption and can be formed at room temperature. Because of high mobility, a necessary TFT size is small, so high definition can be realized.

According to the present invention, the n-type TFT whose channel layer is an amorphous metal oxide semiconductor layer is used. Therefore, because of the amorphous layer, it is possible to produce a TFT whose flatness is high and variations in characteristics are small.

Further features of the present invention will become apparent from the following description of exemplary embodiments with reference to the attached drawings.

BEST MODE FOR CARRYING OUT THE INVENTION

Hereinafter, exemplary embodiments of the light emitting display device of the present invention will be described with reference to the drawings.

In one embodiment of the present invention, a light emitting display device using an OLED element will be described, but the present invention can also be applied to a light emitting display device other than the OLED element, which emits light with a supplied current, and to a current load device using a normal current load, which shows an arbitrary function, with a supplied current.

In addition, this embodiment is described by n-type TFTs. Alternatively, as described later, it is possible to be composed of p-type TFTs, instead of the n-type TFTs, in the same manner with an anode terminal of the OLED element being replaced with a cathode terminal.

According to the TFT used in this embodiment, a threshold voltage of the parameters indicating TFT characteristics varies or a threshold voltage shift appears as a TFT characteristic shift caused by electrical stress. Assume that a variation in mobility or a shift thereof is within a range of specifications of a required current load device.

The threshold voltage in this embodiment ideally corresponds to a minimum gate-source terminal voltage at which a current can flow between a drain terminal and a source terminal. In an actual TFT element, a current flows between the drain terminal and the source terminal even when a voltage is equal to or smaller than the threshold voltage. However, when the voltage is equal to or smaller than the threshold voltage, the current rapidly reduces with a reduction in voltage.

In an actual circuit, the threshold voltage is not necessarily a constant value in view of elements and materials and is determined based on a relationship between a connected terminal and an applied voltage.

Specific examples in this embodiment are as follows.

1) When the source terminal is opened, the gate terminal and the drain terminal are connected with each other, and a voltage V is applied, a voltage is charged to the source terminal rather than the drain terminal. After a lapse of a predetermined period, a voltage difference V−V1 (V>V1) between a gate-drain terminal voltage V and a source terminal voltage V1 is the threshold voltage.

2) In contrast to this, when a voltage V is applied to the source terminal, the gate terminal and the drain terminal are connected with each other, and a voltage sufficiently higher than the voltage V is applied followed by being opened, the voltage of the drain terminal is discharged to the source terminal. After a lapse of a predetermined period, a voltage difference V2−V (V2>V) between a gate-drain terminal voltage V2 and a source terminal voltage V is the threshold voltage.

Figure 9:
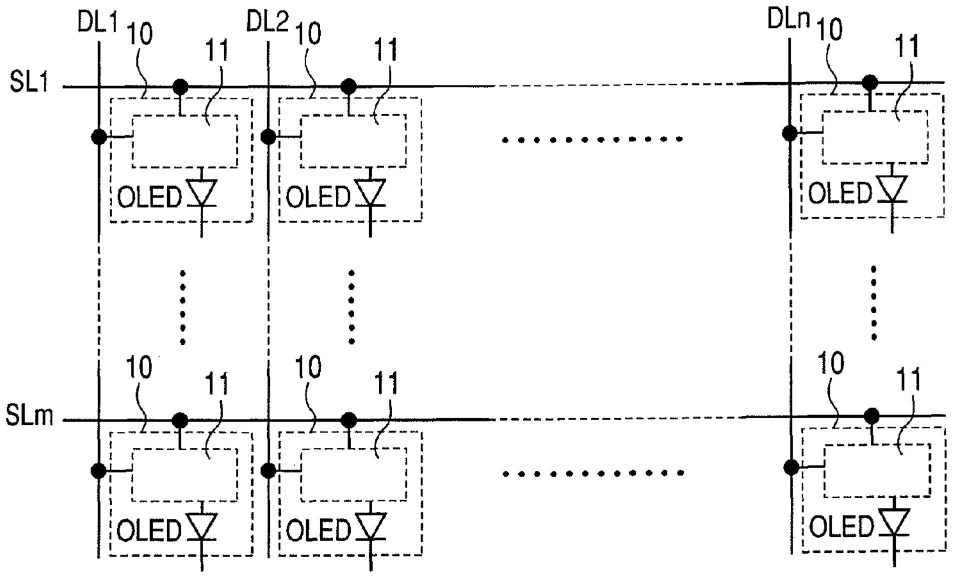
FIG. 9 illustrates a structure of an OLED display device in the case where one scanning line is provided.

Hereinafter, exemplary embodiments of the light-emitting display device using an OLED element will be described. As described above, the present invention is not limited to the OLED element and can be applied to other current-drive type light-emitting elements or current loads. An n-type TFT, whose channel layer is made of an amorphous metal oxide semiconductor having a carrier density equal to or smaller than $10^{18}$ ($cm^{-3}$), is used as TFTs included in a drive circuit. The n-type TFT has a field effect mobility equal to or larger than 1 ($cm^2/Vs$) and an on/off ratio equal to or larger than $10^6$. The present invention is not limited to this and can be applied to an a-Si TFT and an OS TFT. The present invention can be also applied to a structure using only the n-type TFT whose channel layer is made of another semiconductor material. In the following description, a pixel arrangement of the light-emitting device is similar to the pixel arrangement illustrated in FIG. 9 described above except that not one but multiple scanning lines are arranged. Therefore, the detailed description is omitted and a structure of a pixel and an operation thereof will be mainly described.

First Embodiment

Figure 1:
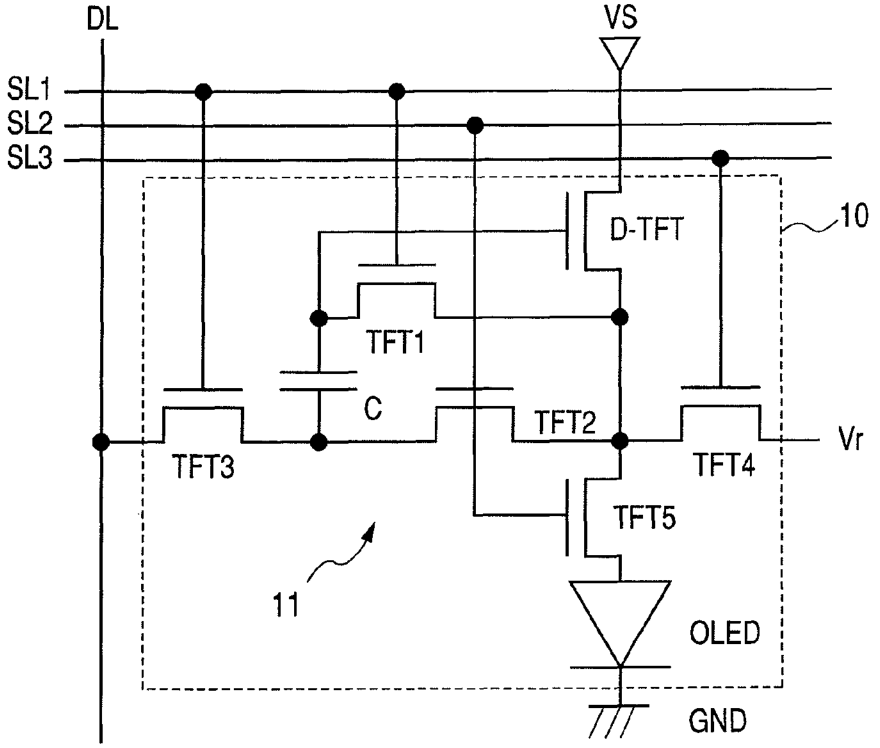
FIG. 1 is a circuit diagram illustrating a structure of a light-emitting display device according to a first embodiment.

FIG. 1 illustrates a pixel structure of a light-emitting display device using an OLED element (hereinafter, referred to as OLED display) according to a first embodiment of the present invention.

The OLED display according to this embodiment has each pixel 10 which includes an OLED element whose cathode terminal is connected (grounded) with a GND (ground) line (hereinafter, referred to as GND) and a drive circuit 11 connected with an anode terminal of the OLED.

The OLED has a structure in which a light-emitting layer made of an organic material is sandwiched between the anode terminal and the cathode terminal and emits light at a luminance corresponding to a current supplied from the drive circuit 11. The current supplied from the drive circuit 11 to the OLED is determined based on a control voltage from a data line.

The drive circuit 11 includes a driving transistor having a gate terminal, a source terminal, and a drain terminal, for driving the OLED, a capacitor element C whose one end is connected with a gate terminal of a D-TFT, and multiple switch elements.

The driving transistor is comprised of an n-type thin film transistor (hereinafter, referred to as D-TFT). The drain terminal of the D-TFT is connected with a power supply line VS and the gate terminal thereof is connected with one end of the capacitor element C. The source terminal of the D-TFT is connected with the anode terminal of the OLED through the switch elements. The source terminal of the D-TFT may be directly connected with the anode terminal of the OLED.

When the drive circuit 11 supplies the current to the OLED, the capacitor element C and the multiple switch elements compose a booster section for increasing a gate terminal voltage of the D-TFT to a voltage obtained by summing up a voltage for supplying the current to the OLED, a threshold voltage of the D-TFT, and a source terminal voltage of the D-TFT.

The multiple switch elements include first to fifth switch elements.

The first switch element is comprised of an n-type TFT (hereinafter, referred to as TFT1). One of the source and drain terminals of the TFT1 is connected with the source terminal of the D-TFT and the other of the source and drain terminals thereof is connected with the gate terminal of the D-TFT.

The second switch element is comprised of an n-type TFT (hereinafter, referred to as TFT2). One of the source and drain terminals of the TFT2 is connected with the source terminal of the D-TFT and the other of the source and drain terminals thereof is connected with the other end (end which is not connected with the gate terminal of the D-TFT) of the capacitor element C.

The third switch element is comprised of an n-type TFT (hereinafter, referred to as TFT3). One of the source and drain terminals of the TFT3 is connected with a data line DL and the other of the source and drain terminals thereof is connected with the other end which is not connected with the gate terminal of the D-TFT of the capacitor element C. The data line DL has such a structure that a control voltage which is a voltage corresponding to gradation can be applied thereto.

The fourth switch element is comprised of an n-type TFT (hereinafter, referred to as TFT4). One of the source and drain terminals of the TFT4 is connected with the source terminal of the D-TFT and the other of the source and drain terminals thereof is connected with a reference voltage line Vr for supplying a reference voltage Vref.

The fifth switch element is comprised of an n-type TFT (hereinafter, referred to as TFT5). One of the source and drain terminals of the TFT5 is connected with the source terminal of the D-TFT and the other of the source and drain terminals thereof is connected with the anode terminal of the OLED.

The OLED display further includes, in addition to the GND and a reference voltage line Vr, a data line DL, first to third scanning lines SL1 to SL3, and a power supply line VS. The data line DL is connected with one of the source terminal and the drain terminal of the TFT3 to supply a control voltage VD for controlling the current supplied from the D-TFT to the OLED. The first scanning line SL1 is connected with the gate terminal of the TFT1 and the gate terminal of the TFT3 to supply a voltage signal SV1 thereto. The second scanning line SL2 is connected with the gate terminal of the TFT2 and the gate terminal of the TFT5 to supply a voltage signal SV2 thereto. The third scanning line SL3 is connected with the gate terminal of the TFT4 to supply a voltage signal SV3 thereto. The power supply line VS is used to supply one of voltages VS1 and VS2 (corresponds to a unit for changing a voltage of the power supply line VS).

When the threshold voltage of the D-TFT is expressed as Vt, the voltages VS1 and VS2 of the power supply line VS satisfy "VS1>VS2" and "Vref−Vt>VS2". When the current is to be supplied to the OLED, the voltage VS1 is set to such a voltage that the D-TFT operates in a saturation region. A capacitance value of the capacitor element C is set to a value equal to or larger than three times a sum of parasitic capacitances including an overlap capacitance with respect to the D-TFT.

Figure 2:
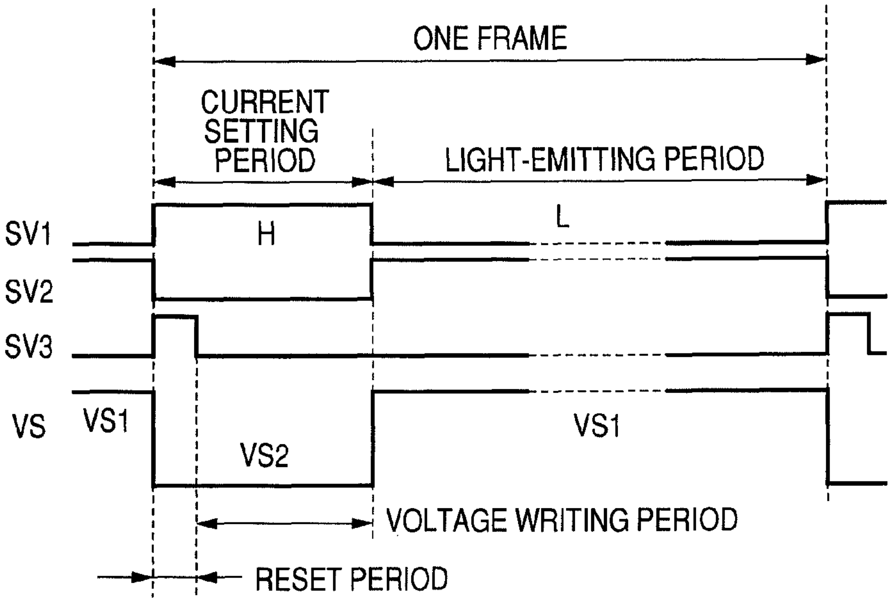
FIG. 2 is an explanatory timing chart illustrating an operation in the first embodiment.

FIG. 2 is a timing chart illustrating an operation in this embodiment and the operation will be described below.

The voltage signal SV1 of the first scanning line SL1 is set to an H (High) level. The voltage signal SV2 of the second scanning line SL2 is set to an L (Low) level. The voltage signal SV3 of the third scanning line SL3 is set to the H (High) level. The voltage VS2 is set for the power supply line VS. For this period (hereinafter, referred to as reset period), the TFT1 and the TFT3 are in an on-state (ON), the TFT2 and TFT5 are in an off-state (OFF), and the TFT4 is in the on-state (ON). For this period, each of the gate terminal voltage and the source terminal voltage of the D-TFT is equal to the reference voltage Vref of the reference voltage line Vr. The drain terminal voltage is equal to the voltage VS2 of the power supply line VS. Further, a voltage of the other end (end which is not connected with the gate terminal of the D-TFT) of the capacitor element C is equal to the control voltage VD of the data line DL.

Subsequently, the voltage signal SV1 of the first scanning line SL1 is set to the H level. The voltage signal SV2 of the second scanning line SL2 is set to the L level. The voltage signal SV3 of the third scanning line SL3 is set to the L level. The voltage VS2 is set for the power supply line VS. For this period (hereinafter, referred to as voltage writing period), the TFT1 and the TFT3 are turned ON, the TFT2 and TFT5 are turned OFF, and the TFT4 is turned OFF. For this period, each of the gate terminal voltage and the source terminal voltage of the D-TFT is equal to a sum "VS2+Vt" of the voltage VS2 of the power supply line VS and the threshold voltage Vt of the D-TFT. The drain terminal voltage is equal to the voltage VS2 of the power supply line VS. Further, a voltage of the other end (end which is not connected with the gate terminal of the D-TFT) of the capacitor element C is equal to the control voltage VD of the data line DL. As a result, a voltage difference "VS2+Vt−VD" is held between both ends of the capacitor element C.

In this embodiment, assume that the reset period and the voltage writing period are combined, and a period for which the TFT1 and the TFT3 are turned ON and the TFT2 and TFT5 are turned OFF is a current setting period.

After that, the voltage signal SV1 of the first scanning line SL1 is set to the L level. The voltage signal SV2 of the second scanning line SL2 is set to the H level. The voltage signal SV3 of the third scanning line SL3 is set to the L level. The voltage VS1 is set for the power supply line VS. For this period (hereinafter, referred to as light-emitting period), the TFT1 and the TFT3 are turned OFF, the TFT2 and TFT5 are turned ON, and the TFT4 is turned OFF. For this period, even when the source terminal voltage of the D-TFT varies, a voltage difference between the gate terminal and the source terminal of the D-TFT is held to "VS2+Vt−VD" by a charge pump effect.

In other words, in this embodiment, a voltage determined based on the voltage (VS2) of the drain terminal of the driving transistor and the control voltage (VD) supplied from the data line during the current setting period is equal to a voltage (VS2−VD) obtained by subtracting the control voltage (VD) supplied from the data line from the voltage (VS2) of the drain terminal of the driving transistor during the current setting period.

Therefore, a voltage difference (Vg−Vs) between the gate terminal and the source terminal of the driving transistor is equal to a voltage obtained by summing up the threshold voltage (Vt) of the driving transistor and the voltage determined based on the voltage of the drain terminal of the driving transistor during the current setting period and the control voltage supplied from the data line, that is, "Vg−Vs=VS2+Vt−VD". Note that Vg indicates the gate terminal voltage of the D-TFT and Vs indicates the source terminal voltage of the D-TFT.

When light is to be emitted from the OLED, voltages are set such that "VS2−VD>0" and "VS2−VD<VS1" are satisfied, the voltage VS1 of the power supply line VS is sufficiently high, and the D-TFT operates in the saturation region, because the threshold voltage of the D-TFT is Vt.

At this time, a current ID expressed by the following expression is supplied from the D-TFT to the OLED.

$$ID=0.5\times\beta\times(Vg-Vs-Vt)^2=0.5\times\beta\times(VS2-VD)^2$$

Note that β denotes a parameter indicating the current capability of the D-TFT, which depends on the mobility, gate capacitance, and size of the D-TFT. Therefore, the current ID can be controlled based on the control voltage VD of the data line DL. The OLED emits light at a luminance corresponding to the supplied current ID based on the current-luminance characteristic.

In the display operation of the OLED display, for example, the above-mentioned operation is performed on the pixels 10 belonging to the same row at the same time and successively performed for all rows to display a screen image. A display period of a screen image is called a frame. The frame is repeated every 1/60 seconds to change display, thereby displaying an image.

Therefore, according to this embodiment, as is apparent from the equation of the current ID, the ID is independent of the threshold voltage Vt of the D-TFT. As a result, even when the threshold voltage Vt varies or is changed by electrical stress, the current supplied to the OLED remains unchanged and the D-TFT operates as the constant current source. Thus, high-quality display without unevenness can be performed.

In this embodiment, the number of capacitors used in the drive circuit is only one and thus there is no problem of the precision of the capacitance ratio.

In this embodiment, the current ID is controlled based on the voltage, so high-speed operation can be realized. Therefore, the present invention can be applied to a large-size and high-definition light-emitting display device whose load is large.

In this embodiment, although the drive circuit includes only the n-type TFTs, the anode of the OLED can be provided on the drive circuit side.

In this embodiment, any of a positive voltage and a negative voltage can be set as the control voltage VD of the data line DL.

In this embodiment, the n-type TFT whose channel layer is a metal oxide semiconductor layer having a carrier density equal to or smaller than $10^{18}$ ($cm^{-3}$) and a field effect mobility equal to or larger than 1 ($cm^2/Vs$) can be used as the n-type TFT. As compared with the case of a structure using the a-Si or OS TFT, when the n-type TFT whose channel layer is the metal oxide semiconductor layer is used, it is possible to produce a light-emitting display device using a TFT which has low power consumption and can be formed at room temperature. Further, because of high mobility, a necessary TFT size is small, so high definition can be realized.

In this embodiment, the n-type TFT whose channel layer is the amorphous metal oxide semiconductor layer is used. Therefore, because of the amorphous layer, it is possible to produce a TFT whose flatness is high and variations in characteristics are small.

In this embodiment, a period for which the OLED does not emit light can be set within the light-emitting period by a means of, for example, turning off the TFT5 or changing the voltage of the power supply line VS to a voltage in the case where the current is not supplied from the D-TFT to the OLED. When such a period is set, the quality of moving picture display to the human eye can be enhanced.

The first scanning line SL1 is divided into two, a scanning line SL1-1 connected with the gate terminal of the TFT1 and a scanning line SL1-2 connected with the gate terminal of the TFT3 are provided thereto. A voltage signal SV1-1 of the scanning line SL1-1 is changed from the H level to the L level earlier than a voltage signal SV1-2 of the scanning line SL1-2. Therefore, when the current setting period of the TFT1 is changed to the light-emitting period, the change from the ON-state of the TFT1 to the OFF-state thereof is performed earlier than the change from the OFF-state of each of the TFT2 and the TFT5 to the ON-state thereof and the change from the ON-state of the TFT3 to the off-state thereof. In this case, the voltage held by the capacitor element C is resistant to the influence of an error factor such as a noise which is caused by the operation of other TFTs, so higher-precision operation can be realized.

Second Embodiment

A pixel structure of a light-emitting display device using an OLED element according to a second embodiment of the present invention is similar to the pixel arrangement of the first embodiment. Note that, in this embodiment, the voltage VS2 of the power supply line VS is a constant value. When the threshold voltage of the D-TFT is expressed as Vt, "Vref−Vt>VS2" is satisfied. In other words, a highest voltage other than the voltage signals SV1, SV2, and SV3 of the first, second, and third scanning lines SL1, SL2, and SL3 is the reference voltage Vref of the reference voltage line Vr. The voltage VS2 of the power supply line VS is set to such a voltage that the D-TFT operates in the saturation region when the current is supplied to the OLED.

Figure 3:
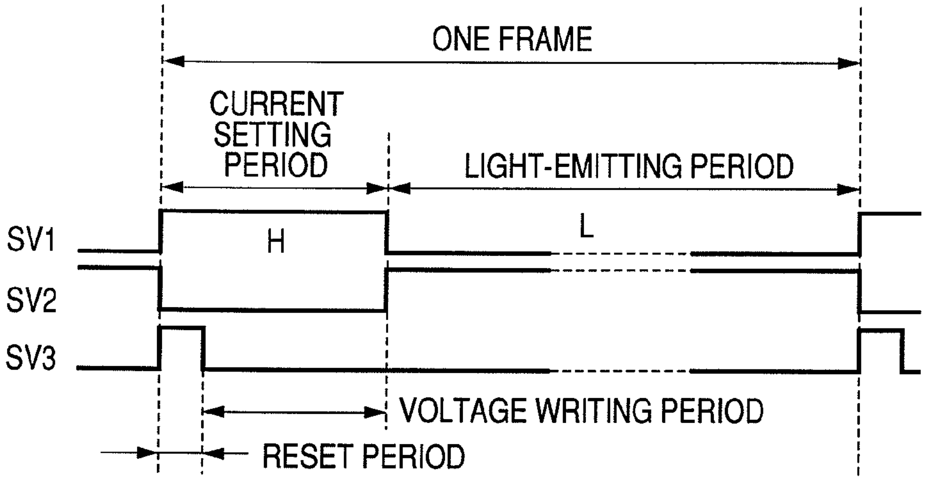
FIG. 3 is an explanatory timing chart illustrating an operation in a second embodiment.

FIG. 3 is a timing chart illustrating an operation in this embodiment. The operation in this embodiment is similar to the operation in this first embodiment except that the voltage VS2 of the power supply line VS is the constant value as described above.

In this embodiment, the same effect as the first embodiment is obtained. The unit for changing the voltage of the power supply line VS is unnecessary, so the structure of the light-emitting display device using the OLED element is simplified.

Third Embodiment

Figure 4:
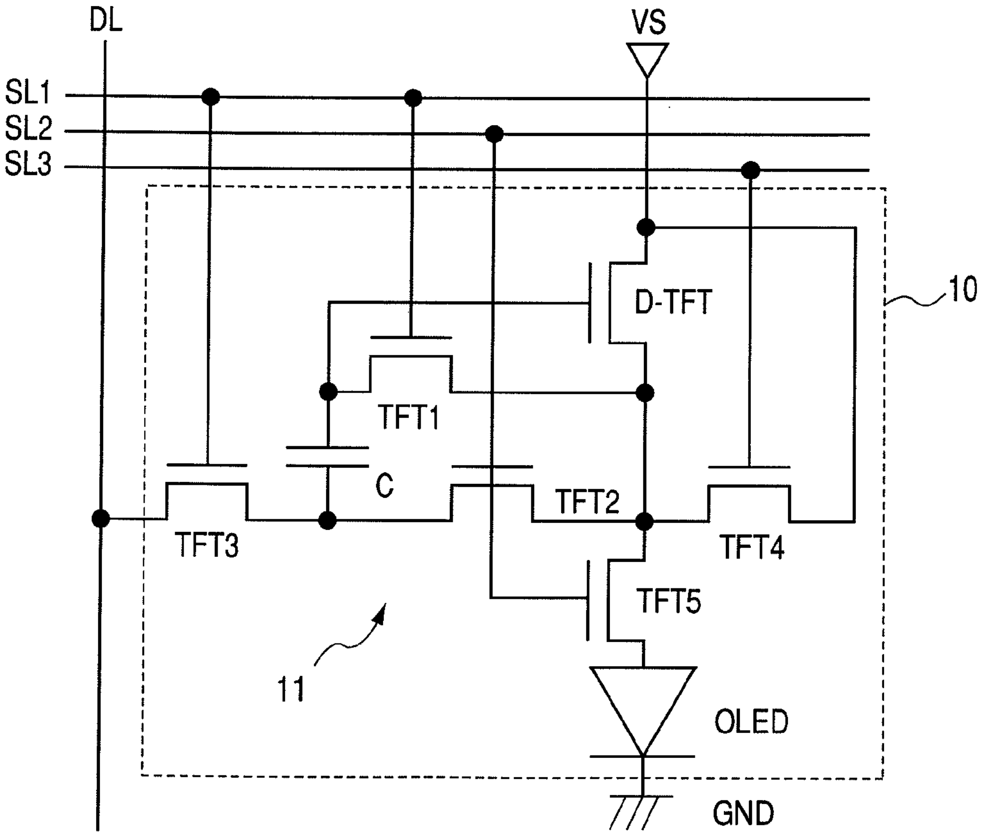
FIG. 4 is a circuit diagram illustrating a structure of a light-emitting display device according to a third embodiment.

FIG. 4 illustrates a pixel structure of a light-emitting display device using an OLED element according to a third embodiment of the present invention. The description of the same constituent elements as the first embodiment is simplified or omitted.

The OLED display according to this embodiment has each pixel 10 which includes an OLED element whose cathode terminal is connected (grounded) with a GND (ground) line (hereinafter, referred to as GND) and a drive circuit 11 connected with an anode terminal of the OLED.

The drive circuit 11 includes a driving transistor having a gate terminal, a source terminal, and a drain terminal, for driving the OLED, a capacitor element C whose one end is connected with a gate terminal of a D-TFT, and multiple switch elements.

The driving transistor is comprised of an n-type TFT (hereinafter, referred to as D-TFT). The drain terminal of the D-TFT is connected with a power supply line VS and the gate terminal thereof is connected with one end of the capacitor element C.

The multiple switch elements include first to fifth switch elements.

The first switch element is comprised of an n-type TFT (hereinafter, referred to as TFT1). One of the source and drain terminals of the TFT1 is connected with the source terminal of the D-TFT and the other of the source and drain terminals thereof is connected with the gate terminal of the D-TFT.

The second switch element is comprised of an n-type TFT (hereinafter, referred to as TFT2). One of the source and drain terminals of the TFT2 is connected with the source terminal of the D-TFT and the other of the source and drain terminals thereof is connected with the other end (end which is not connected with the gate terminal of the D-TFT) of the capacitor element C.

The third switch element is comprised of an n-type TFT (hereinafter, referred to as TFT3). One of the source and drain terminals of the TFT3 is connected with a data line DL and the other of the source and drain terminals thereof is connected with the other end (end which is not connected with the gate terminal of the D-TFT) of the capacitor element C.

The fourth switch element is comprised of an n-type TFT (hereinafter, referred to as TFT4). One of the source and drain terminals of the TFT4 is connected with the source terminal of the D-TFT and the other of the source and drain terminals thereof is connected with a drain terminal of the D-TFT.

The fifth switch element is comprised of an n-type TFT (hereinafter, referred to as TFT5). One of the source and drain terminals of the TFT5 is connected with the source terminal of the D-TFT and the other of the source and drain terminals thereof is connected with the anode terminal of the OLED.

The OLED display further includes the GND, a data line DL, first to third scanning lines SL1 to SL3, and a power supply line VS. The data line DL is connected with one of the source terminal and the drain terminal of the TFT3 to supply a control voltage VD for controlling the current supplied from the D-TFT to the OLED. The first scanning line SL1 is connected with the gate terminal of the TFT1 and the gate terminal of the TFT3 to supply a voltage signal SV1 thereto. The second scanning line SL2 is connected with the gate terminal of the TFT2 and the gate terminal of the TFT5 to supply a voltage signal SV2 thereto. The third scanning line SL3 is connected with the gate terminal of the TFT4 to supply a voltage signal SV3 thereto. The power supply line VS is used to supply one of voltages VS1 and VS2.

When the threshold voltage of the D-TFT is expressed as Vt, the voltages VS1 and VS2 of the power supply line VS satisfy "VS1−Vt>VS2". Further, when the current is to be supplied to the OLED, the voltage VS1 is set to such a voltage that the D-TFT operates in a saturation region. A capacitance value of the capacitor element C is set to a value equal to or larger than three times a sum of parasitic capacitances including an overlap capacitance with respect to the D-TFT.

Figure 5:
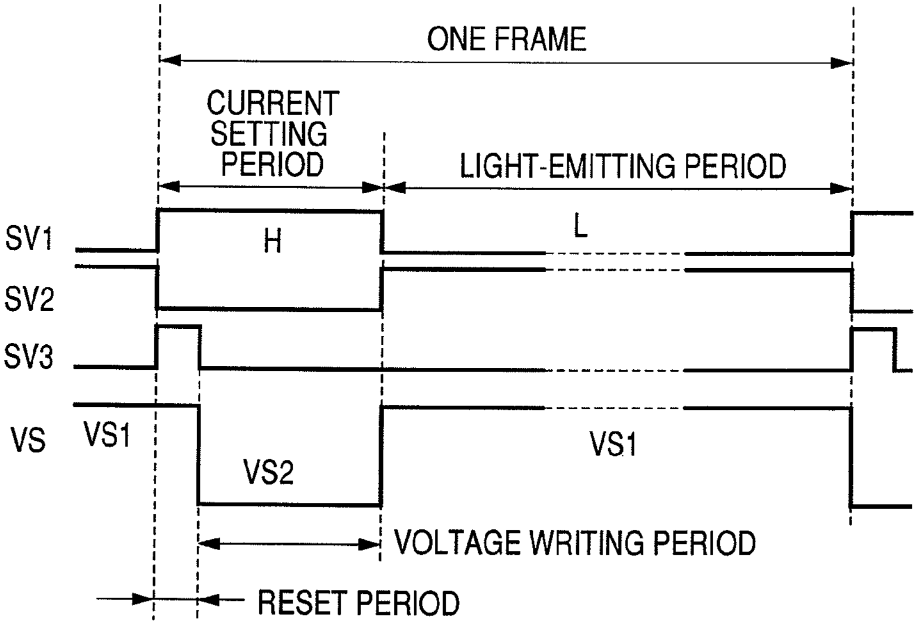
FIG. 5 is an explanatory timing chart illustrating an operation in the third embodiment.

FIG. 5 is a timing chart illustrating an operation in this embodiment and the operation will be described below.

The voltage signal SV1 of the first scanning line SL1 is set to an H level. The voltage signal SV2 of the second scanning line SL2 is set to an L level. The voltage signal SV3 of the third scanning line SL3 is set to the H level. The voltage VS1 is set for the power supply line VS. For this period (hereinafter, referred to as reset period), the TFT1 and the TFT3 are in an on-state (ON), the TFT2 and TFT5 are in an off-state (OFF), and the TFT4 is in the on-state (ON). For this period, each of the gate terminal voltage, the source terminal voltage, and the drain terminal voltage of the D-TFT is equal to the voltage VS1 of the power supply line VS. Further, a voltage of the other end (end which is not connected with the gate terminal of the D-TFT) of the capacitor element C is equal to the control voltage VD of the data line DL.

Subsequently, the voltage signal SV1 of the first scanning line SL1 is set to the H level. The voltage signal SV2 of the second scanning line SL2 is set to the L level. The voltage signal SV3 of the third scanning line SL3 is set to the L level. The voltage VS2 is set for the power supply line VS. For this period (hereinafter, referred to as voltage writing period), the TFT1 and the TFT3 are turned ON, the TFT2 and TFT5 are turned OFF, and the TFT4 is turned OFF. For this period, each of the gate terminal voltage and the source terminal voltage of the D-TFT is equal to a sum "VS2+Vt" of the voltage VS2 of the power supply line VS and the threshold voltage Vt of the D-TFT. The drain terminal voltage is equal to the voltage VS2 of the power supply line VS. Further, a voltage of the other end (end which is not connected with the gate terminal of the D-TFT) of the capacitor element C is equal to the control voltage VD of the data line DL. As a result, a voltage difference "VS2+Vt−VD" is held between both ends of the capacitor element C.

In this embodiment, assume that the reset period and the voltage writing period are combined, and a period for which the TFT1 and the TFT3 are turned ON and the TFT2 and TFT5 are turned OFF is a current setting period.

After that, the voltage signal SV1 of the first scanning line SL1 is set to the L level. The voltage signal SV2 of the second scanning line SL2 is set to the H level. The voltage signal SV3 of the third scanning line SL3 is set to the L level. The voltage VS1 is set for the power supply line VS. For this period (hereinafter, referred to as light-emitting period), the TFT1 and the TFT3 are turned OFF, the TFT2 and TFT5 are turned ON, and the TFT4 is turned OFF. For this period, even when the source terminal voltage of the D-TFT varies, a voltage difference between the gate terminal and the source terminal of the D-TFT is held to "VS2+Vt−VD" by a charge pump effect.

In other words, in this embodiment, a voltage, which determined based on the voltage (VS2) of the drain terminal of the driving transistor and the control voltage (VD) supplied from the data line during the current setting period, is equal to a voltage "VS2−VD".

Therefore, a voltage difference (Vg−Vs) between the gate terminal and the source terminal of the driving transistor is equal to a voltage obtained by summing up the threshold voltage (Vt) of the driving transistor and the voltage determined based on the voltage of the drain terminal of the driving transistor during the current setting period and the control voltage supplied from the data line, that is, "Vg−Vs=VS2+Vt−VD". Note that Vg indicates the gate terminal voltage of the D-TFT and Vs indicates the source terminal voltage of the D-TFT.

Voltages are set such that "VS2−VD>0" and "VS2−VD<VS1" are satisfied, the voltage VS1 of the power supply line VS is sufficiently high, and the D-TFT operates in the saturation region, because the threshold voltage of the D-TFT is Vt.

At this time, a current ID expressed by the following expression is supplied from the D-TFT to the OLED.

$$ID=0.5\times\beta\times(Vg-Vs-Vt)^2=0.5\times\beta\times(VS2-VD)^2$$

Note that β denotes a parameter indicating the current capability, which depends on the mobility of the D-TFT, gate capacitance, and size of the D-TFT. Therefore, the current ID can be controlled based on the control voltage VD of the data line DL. The OLED emits light at a luminance corresponding to the supplied current ID based on the current-luminance characteristic.

In the display operation of the OLED display, for example, the above-mentioned operation is performed on the pixels belonging to the same row at the same time and successively performed for all rows to display a screen image. A display period of a screen image is called a frame. The frame is repeated every 1/60 seconds to change display, thereby displaying an image.

In this embodiment, the same effect as described in the first embodiment is obtained. The reference voltage line Vr is unnecessary, so the structure is simplified.

Fourth Embodiment

Figure 6:
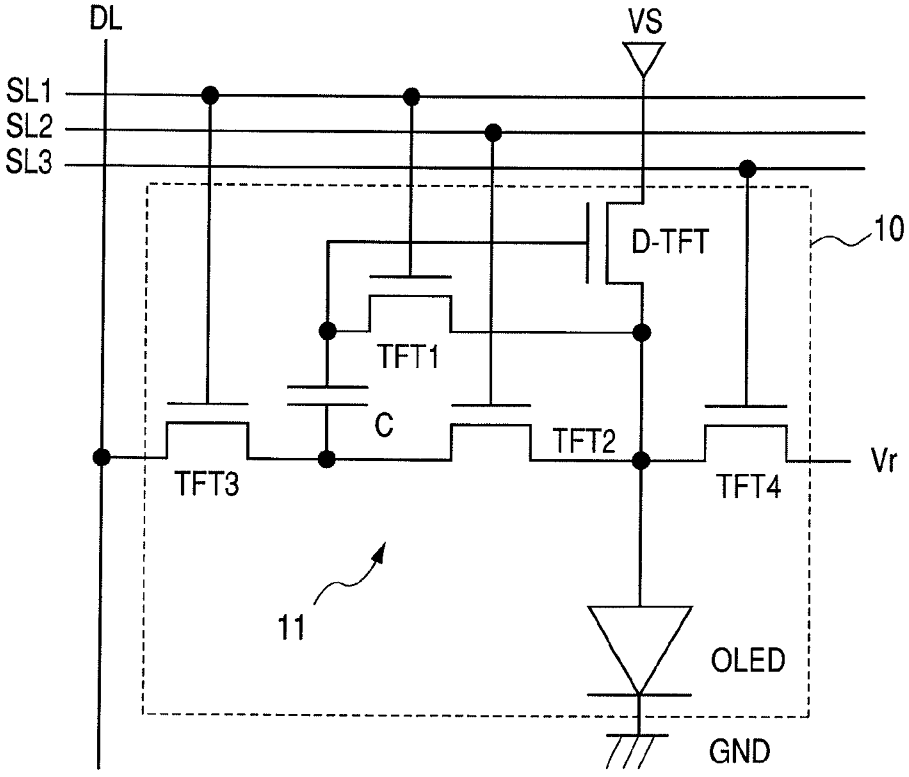
FIG. 6 is a circuit diagram illustrating a structure of a light-emitting display device according to a fourth embodiment.

FIG. 6 illustrates a pixel structure of a light-emitting display device using an OLED element according to a fourth embodiment of the present invention. The description of the same constituent elements as the first embodiment is simplified or omitted.

The OLED display according to this embodiment has each pixel 10 which includes an OLED element whose cathode terminal is connected (grounded) with a GND (ground) line (hereinafter, referred to as GND) and a drive circuit 11 connected with an anode terminal of the OLED.

The drive circuit 11 includes a driving transistor having a gate terminal, a source terminal, and a drain terminal, for driving the OLED, a capacitor element C whose one end is connected with a gate terminal of a D-TFT, and multiple switch elements.

The driving transistor includes an n-type TFT (hereinafter, referred to as D-TFT). The drain terminal of the D-TFT is connected with a power supply line VS and the gate terminal thereof is connected with one end of the capacitor element C.

The multiple switch elements include first to fourth switch elements.

The first switch element is comprised of an n-type TFT (hereinafter, referred to as TFT1). One of the source and drain terminals of the TFT1 is connected with the source terminal of the D-TFT and the other of the source and drain terminals thereof is connected with the gate terminal of the D-TFT.

The second switch element is comprised of an n-type TFT (hereinafter, referred to as TFT2). One of the source and drain terminals of the TFT2 is connected with the source terminal of the D-TFT and the other of the source and drain terminals thereof is connected with the other end (end which is not connected with the gate terminal of the D-TFT) of the capacitor element C.

The third switch element is comprised of an n-type TFT (hereinafter, referred to as TFT3). One of the source and drain terminals of the TFT3 is connected with a data line DL and the other of the source and drain terminals thereof is connected with the other end (end which is not connected with the gate terminal of the D-TFT) of the capacitor element C.

The fourth switch element is comprised of an n-type TFT (hereinafter, referred to as TFT4). One of the source and drain terminals of the TFT4 is connected with the source terminal of the D-TFT and the other of the source and drain terminals thereof is connected with a reference voltage line Vr for supplying a reference voltage Vref.

The OLED display further includes, in addition to the GND and the reference voltage line Vr, a data line DL, first to third scanning lines SL1 to SL3, and a power supply line VS. The data line DL is connected with one of the source terminal and the drain terminal of the TFT3 to supply a control voltage VD for controlling the current supplied from the D-TFT to the OLED. The first scanning line SL1 is connected with the gate terminal of the TFT1 and the gate terminal of the TFT3 to supply a voltage signal SV1 thereto. The second scanning line SL2 is connected with the gate terminal of the TFT2 to supply a voltage signal SV2 thereto. The third scanning line SL3 is connected with the gate terminal of the TFT4 to supply a voltage signal SV3 thereto. The power supply line VS is used to supply one of voltages VS1 and VS2.

Here, when the threshold voltage of the D-TFT is expressed as Vt, the voltages VS1 and VS2 of the power supply line VS satisfy "VS1>VS2" and "Vref−Vt>VS2". When the current is to be supplied to the OLED, the voltage VS1 of the power supply line VS is set to such a voltage that the D-TFT operates in the saturation region. The reference voltage Vref is set to a value equal to or smaller than the threshold voltage in the case where the OLED into which the current flows emits light. In this embodiment, the voltage VS2 of the power supply line VS is set to the GND and the control voltage VD of the data line DL is set to a negative voltage. The capacitance value of the capacitor element C is set to a value equal to or larger than three times a sum of parasitic capacitances including an overlap capacitance with respect to the D-TFT.

Figure 7:
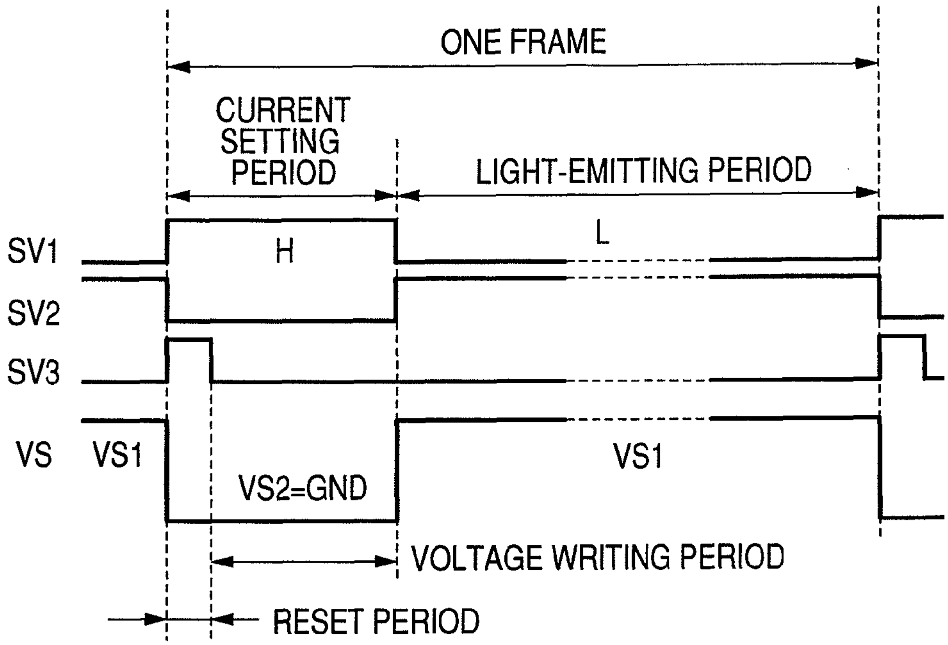
FIG. 7 is an explanatory timing chart illustrating an operation in the fourth embodiment.
Figure 8:
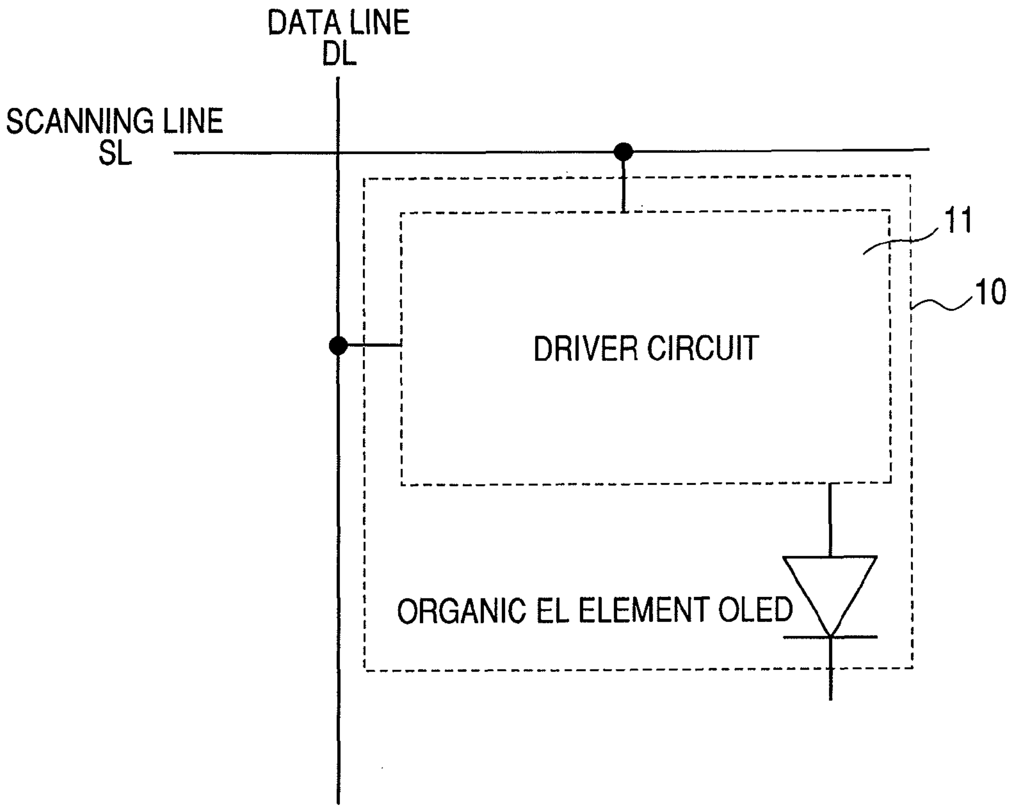
FIG. 8 illustrates a structure of a pixel.

FIG. 7 is a timing chart illustrating an operation in this embodiment and the operation will be described below.

The voltage signal SV1 of the first scanning line SL1 is set to an H level. The voltage signal SV2 of the second scanning line SL2 is set to an L level. The voltage signal SV3 of the third scanning line SL3 is set to the H level. The voltage VS2 is set for the power supply line VS. For this period (hereinafter, referred to as reset period), the TFT1 and the TFT3 are in an on-state (ON), the TFT2 is in an off-state (OFF), and the TFT4 is in the on-state (ON). For this period, each of the gate terminal voltage and the source terminal voltage of the D-TFT is equal to the reference voltage Vref of the reference voltage line Vr. The drain terminal voltage is equal to the voltage VS2 of the power supply line VS. Further, a voltage of the other end (end which is not connected with the gate terminal of the D-TFT) of the capacitor element C is equal to the control voltage VD of the data line DL.

Subsequently, the voltage signal SV1 of the first scanning line SL1 is set to the H level. The voltage signal SV2 of the second scanning line SL2 is set to the L level. The voltage signal SV3 of the third scanning line SL3 is set to the L level. The voltage VS2 is set for the power supply line VS. For this period (hereinafter, referred to as voltage writing period), the TFT1 and the TFT3 are turned ON, the TFT2 is turned OFF, and the TFT4 is turned OFF. For this period, each of the gate terminal voltage and the source terminal voltage of the D-TFT is equal to a sum "VS2+Vt" of the voltage VS2 of the power supply line VS and the threshold voltage Vt of the D-TFT when "VS2+Vt" is smaller than the threshold voltage of the OLED. The drain terminal voltage is equal to the voltage VS2 of the power supply line VS. Further, a voltage of the other end (end which is not connected with the gate terminal of the D-TFT) of the capacitor element C is equal to the voltage of the data line DL. As a result, a voltage difference "VS2+Vt−VD" is held between both ends of the capacitor element C.

In this embodiment, assume that the reset period and the voltage writing period are combined, and a period for which the TFT1 and the TFT3 are turned ON and the TFT2 is turned OFF is a current setting period. For this period, a current is not supplied to the OLED.

After that, the voltage signal SV1 of the first scanning line SL1 is set to the L level. The voltage signal SV2 of the second scanning line SL2 is set to the H level. The voltage signal SV3 of the third scanning line SL3 is set to the L level. The voltage VS1 is set for the power supply line VS. For this period (hereinafter, referred to as light-emitting period), the TFT1 and the TFT3 are turned OFF, the TFT2 is turned ON, and the TFT4 is turned OFF. For this period, even when the source terminal voltage of the D-TFT varies, a voltage difference between the gate terminal and the source terminal of the D-TFT is held to "VS2+Vt−VD" by a charge pump effect.

In other words, in this embodiment, a voltage determined based on the voltage (VS2) of the drain terminal of the driving transistor and the control voltage (VD) supplied from the data line during the current setting period is equal to a voltage "VS2−VD".

Therefore, a voltage difference (Vg−Vs) between the gate terminal and the source terminal of the driving transistor is equal to a voltage obtained by summing up the threshold voltage (Vt) of the driving transistor and the voltage determined based on the voltage of the drain terminal of the driving transistor during the current setting period and the control voltage supplied from the data line, that is, "Vg−Vs=VS2+Vt−VD". Note that Vg indicates the gate terminal voltage of the D-TFT and Vs indicates the source terminal voltage of the D-TFT.

Voltages are set such that "VS2−VD>0" and "VS2−VD<VS1" are satisfied, the voltage VS1 of the power supply line VS is sufficiently high, and the D-TFT operates in the saturation region, because the threshold voltage of the D-TFT is Vt.

At this time, a current ID expressed by the following expression is supplied from the D-TFT to the OLED.

$$ID=0.5\times\beta\times(Vg-Vs-Vt)^2=0.5\times\beta\times(VS2-VD)^2$$

Note that β denotes a parameter indicating the current capability of the D-TFT, which depends on the mobility, gate capacitance, and size of the D-TFT. Therefore, the current ID can be controlled based on the control voltage VD of the data line DL. The OLED emits light at a luminance corresponding to the supplied current ID based on the current-luminance characteristic.

In the display operation of the OLED display, for example, the above-mentioned operation is performed on the pixels belonging to the same row at the same time and successively performed for all rows to display a screen image. A display period of a screen image is called a frame. The frame is repeated every 1/60 seconds to change display, thereby displaying an image.

In this embodiment, the same effect as described in the first embodiment is obtained. Unlike the first embodiment, the TFT5 is unnecessary, so the structure is simplified. This simplification can be also realized by the setting that the "VS2+Vt" is lower than the threshold voltage of the OLED.

According to this embodiment, for the current setting period, the capacitor element C of the drive circuit included in the pixel holds a sum of the threshold voltage of the D-TFT and the voltage for setting the current supplied to the OLED between the gate terminal and the source terminal of the D-TFT. Therefore, the current supplied to the OLED can be set without depending on the threshold voltage of the D-TFT.

The number of capacitor elements C included in the drive circuit is one. When the capacitance value is sufficiently larger than the parasitic capacitance, the current supplied to the OLED does not depend on the capacitor element C.

According to this embodiment, the current supplied to the OLED is set based on the voltage, so the present invention can be applied to a large-size and high-definition light-emitting display device whose load is large.

According to this embodiment, a structure can be employed in which the drive circuit includes only the n-type TFTs, the anode of the OLED is provided on the drive circuit side, and an anode electrode, a light-emitting layer made of an organic material, and a cathode electrode are layered in the stated order from the lower side.

According to this embodiment, an n-type TFT whose channel layer is a metal oxide semiconductor layer having a carrier density equal to or smaller than $10^{18}$ ($cm^{-3}$) and a field effect mobility equal to or larger than 1 ($cm^2$/Vs) is used as the n-type TFT. Therefore, as compared with the case of a structure using the a-Si or OS TFT, it is possible to produce a light-emitting display device using a TFT which has low power consumption and can be formed at room temperature. Because of high mobility, a necessary TFT size is small, so high definition can be realized.

According to this embodiment, the n-type TFT whose channel layer is the amorphous metal oxide semiconductor layer is used. Therefore, because of the amorphous layer, it is possible to produce a TFT whose flatness is high and variations in characteristics are small.

Fifth Embodiment

Figure 10:
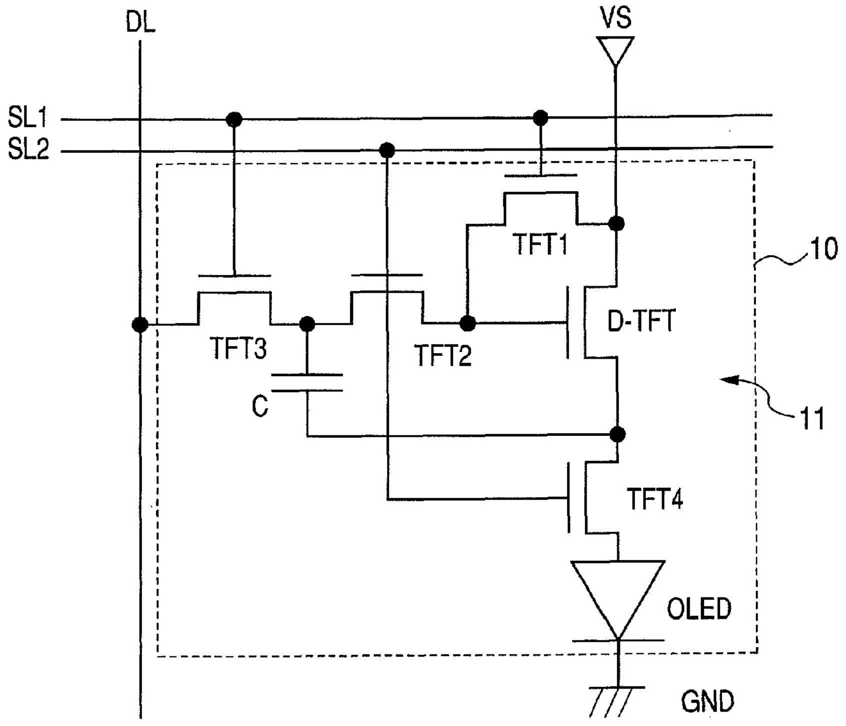
FIG. 10 is a circuit diagram illustrating a structure of a light-emitting display device according to a fifth embodiment.

FIG. 10 illustrates a pixel structure of a light-emitting display device using an OLED element according to a fifth embodiment of the present invention.

The OLED display according to this embodiment has each pixel 10 which includes an OLED element whose cathode terminal is connected (grounded) with a GND (ground) line (hereinafter, referred to as GND) and a drive circuit 11 connected with an anode terminal of the OLED.

The OLED has a structure in which a light-emitting layer made of an organic material is sandwiched between the anode terminal and the cathode terminal and emits light at a luminance corresponding to a current supplied from the drive circuit 11.

The drive circuit 11 includes a driving transistor having a gate terminal, a source terminal, and a drain terminal, for driving the OLED, a capacitor element C whose one end is connected with a source terminal of a D-TFT, and multiple switch elements.

The driving transistor includes an n-type TFT (hereinafter, referred to as D-TFT). The drain terminal of the D-TFT is connected with a power supply line VS.

The capacitor element C and the multiple switch elements compose a booster section for increasing a gate terminal voltage of the D-TFT to a voltage obtained by summing up a voltage for supplying the current to the OLED, a threshold voltage of the D-TFT, and a source terminal voltage of the D-TFT, when the drive circuit 11 supplies the current to the OLED.

The multiple switch elements include first to fourth switch elements.

The first switch element is comprised of an n-type TFT (hereinafter, referred to as TFT1). One of the source and drain terminals of the TFT1 is connected with the drain terminal of the D-TFT and the other of the source and drain terminals thereof is connected with the gate terminal of the D-TFT.

The second switch element is comprised of an n-type TFT (hereinafter, referred to as TFT2). One of the source and drain terminals of the TFT2 is connected with the gate terminal of the D-TFT and the other of the source and drain terminals thereof is connected with the other end (end which is not connected with the source terminal of the D-TFT) of the capacitor element C.

The third switch element is comprised of an n-type TFT (hereinafter, referred to as TFT3). One of the source and drain terminals of the TFT3 is connected with a data line DL and the other of the source and drain terminals thereof is connected with the other end (end which is not connected with the source terminal of the D-TFT) of the capacitor element C.

The fourth switch element is comprised of an n-type TFT (hereinafter, referred to as TFT4). One of the source and drain terminals of the TFT4 is connected with the source terminal of the D-TFT and the other of the source and drain terminals thereof is connected with an anode terminal of the OLED.

The OLED display further includes, in addition to the GND, a data line DL, first and second scanning lines SL1 and SL2, and a power supply line VS. The data line DL is used to supply a control voltage VD for controlling the current supplied from the D-TFT to the OLED. The power supply line VS is used to supply a voltage VS1. The first scanning line SL1 is connected with the gate terminal of the TFT1 and the gate terminal of the TFT3 to supply a voltage signal SV1 thereto. The second scanning line SL2 is connected with the gate terminal of the TFT2 and the gate terminal of the TFT4 to supply a voltage signal SV2 thereto.

When the current is to be supplied to the OLED, the voltage VS1 of the power supply line VS is set to such a voltage that the D-TFT operates in a saturation region. A capacitance value of the capacitor element C is set to a value equal to or larger than three times a sum of parasitic capacitances including an overlap capacitance with respect to the D-TFT.

Figure 11:
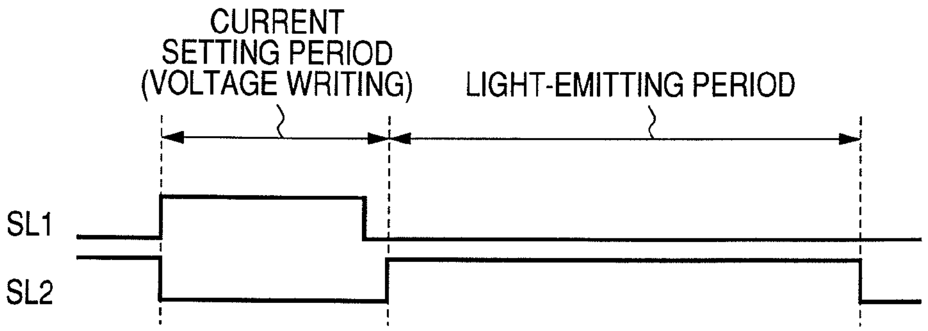
FIG. 11 is an explanatory timing chart illustrating an operation in the fifth embodiment.

FIG. 11 is a timing chart illustrating an operation in this embodiment and the operation will be described below.

The voltage signal SV1 of the first scanning line SL1 is set to the H level. The voltage signal SV2 of the second scanning line SL2 is set to the L level. For this period (hereinafter, referred to as voltage reset period), the TFT1 and the TFT3 are turned ON and the TFT2 and TFT4 are turned OFF. For this period, the source terminal voltage of the D-TFT is equal to "VS1−Vt" when the threshold voltage of the D-TFT is expressed as Vt. A voltage of the other end (end which is not connected with the source terminal of the D-TFT) of the capacitor element C is equal to the control voltage VD of the data line DL. As a result, a voltage difference "VD−VS1+Vt" is held between both ends of the capacitor element C.

In this embodiment, the voltage writing period corresponds to the current setting period for setting the current supplied to the OLED.

After that, the voltage signal SV1 of the first scanning line SL1 is set to the L level. The voltage signal SV2 of the second scanning line SL2 is set to the H level. For this period (hereinafter, referred to as light-emitting period), the TFT1 and the TFT3 are turned OFF, the TFT2 and TFT4 are turned ON. For this period, even when the source terminal voltage of the D-TFT varies, a voltage difference between the gate terminal and the source terminal of the D-TFT is held to "VD−VS1+Vt" by a charge pump effect.

In other words, in this embodiment, a voltage determined based on the voltage (VS1) of the drain terminal of the driving transistor and the control voltage (VD) supplied from the data line during the current setting period is equal to a voltage "VD−VS1" obtained by subtracting the voltage (VS1) of the drain terminal of the driving transistor during the current setting period from the control voltage (VD) supplied from the data line.

Therefore, a voltage difference (Vg−Vs) between the gate terminal and the source terminal of the driving transistor is equal to a voltage obtained by summing up the threshold voltage (Vt) of the driving transistor and the voltage determined based on the voltage of the drain terminal of the driving transistor during the current setting period and the control voltage supplied from the data line, that is, "Vg−Vs=VD−VS1+Vt". Note that Vg indicates the gate terminal voltage of the D-TFT and Vs indicates the source terminal voltage of the D-TFT.

Voltages are set such that the voltage VS1 of the power supply line VS is sufficiently high, and the D-TFT operates in the saturation region.

At this time, a current ID expressed by the following expression is supplied from the D-TFT to the OLED.

$$ID=0.5\times\beta\times(Vg-Vs-Vt)^2=0.5\times\beta\times(VD-VS1)^2$$

Note that β denotes a parameter indicating the current capability of the D-TFT, which depends on the mobility, gate capacitance, and size of the D-TFT. Therefore, the current ID can be controlled based on the control voltage VD of the data line DL. The OLED emits light at a luminance corresponding to the supplied current ID based on the current-luminance characteristic.

In the display operation of the OLED display, for example, the above-mentioned operation is performed on the pixels belonging to the same row at the same time and successively performed for all rows to display a screen image. A display period of a screen image is called a frame. The frame is repeated every 1/60 seconds to change display, thereby displaying an image.

According to this embodiment, as is apparent from the expression expressing the current ID, the ID is independent of the threshold voltage Vt of the D-TFT. As a result, even when the threshold voltage Vt of the D-TFT varies or is changed by electrical stress, the current supplied to the OLED remains unchanged and operates as the constant current source. Thus, high-quality display without unevenness can be performed.

In this embodiment, the number of capacitors used in the drive circuit is only one and thus there is no problem with respect to the precision of the capacitance ratio. The capacitance value of the capacitor element C is equal to or larger than three times a sum of a channel capacitance of the D-TFT and a parasitic capacitance such as an overlap capacitance, so the influence of changes in voltages at the source terminal and the drain terminal of the D-TFT during the current setting period and the light-emitting period can be suppressed.

In this structure, the current ID is controlled based on the voltage, so high-speed operation can be realized. Therefore, the present invention can be applied to a large-size and high-definition light-emitting display device whose load is large.

In this embodiment, although the drive circuit includes only the n-type TFTs, the anode of the OLED can be provided on the drive circuit side.

According to this embodiment, an n-type TFT whose channel layer is a metal oxide semiconductor layer having a carrier density equal to or smaller than $10^{18}$ ($cm^{-3}$) and a field effect mobility equal to or larger than 1 ($cm^2/Vs$) is used as the n-type TFT. Therefore, as compared with the case of a structure using the a-Si or OS TFT, it is possible to produce a light-emitting display device using a TFT which has low power consumption and can be formed at room temperature. Because of high mobility, a necessary TFT size is small, so high definition can be realized.

According to this embodiment, the n-type TFT whose channel layer is the amorphous metal oxide semiconductor layer is used. Therefore, because of the amorphous layer, it is possible to produce a TFT whose flatness is high and variations in characteristics are small.

In this embodiment, the first scanning line SL1 is divided into two, the scanning line SL1-1 connected with the gate terminal of the TFT1 and the scanning line SL1-2 connected with the gate terminal of the TFT3 are provided thereto. The voltage signal SV1-2 of the scanning line SL1-2 is changed from the H level to the L level earlier than the voltage signal SV1-1 of the scanning line SL1-1. Therefore, when the current setting period is shifted to the light-emitting period, the change from the ON-state of the TFT3 to the OFF-state thereof is performed earlier than the change from the OFF-state of each of the TFT2 and the TFT4 to the ON-state thereof and the change from the ON-state of the TFT1 to the OFF-state thereof. In this case, the voltage held by the capacitor element C is resistant to the influence of an error factor such as a noise which is caused by the operation of other TFTs, so higher-precision operation can be realized. The unit for performing the operation of the TFT3 earlier than the operation of the other TFTs when the current setting period is shifted to the light-emitting period as described above can be used even in the following embodiments and thus the same effect is obtained.

Figure 12:
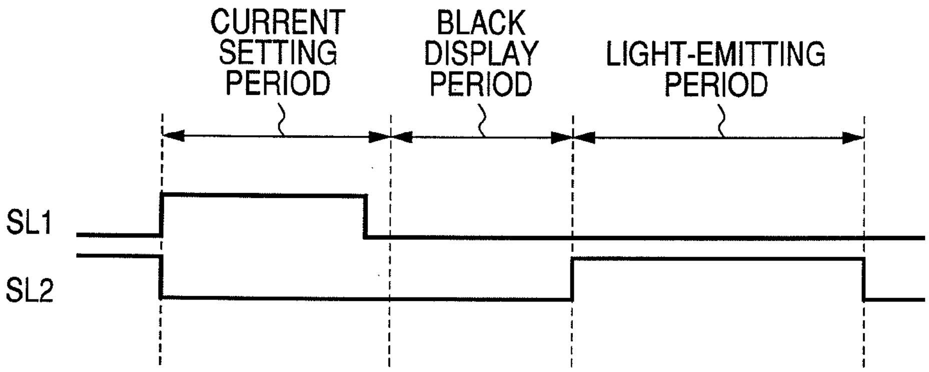
FIG. 12 is another explanatory timing chart illustrating the operation in the fifth embodiment.

In this embodiment, a novel effect is obtained by performing an operation as illustrated in a timing chart of FIG. 12. In FIG. 12, a timing at which the voltage signal SV2 of the second scanning line SL2 is changed from the L level to the H level is shifted to provide a predetermined period between a timing at which the TFT1 and the TFT3 are changed from the ON-state to the OFF-state and a timing at which the TFT2 and the TFT4 are changed from the OFF-state to the ON-state. This period is a non-light-emitting period (hereinafter, referred to as black display period) because the current does not flow into the OLED. When this period is set, the afterimage in the human eye is reduced without providing a new signal line, so the quality of moving picture display can be improved. The black display period can be set even in the embodiments described below and thus the same effect is obtained.

Sixth Embodiment

A pixel structure of a light-emitting display device using an OLED element according to a sixth embodiment of the present invention is illustrated in FIG. 10 as in the fifth embodiment.

Figure 13:
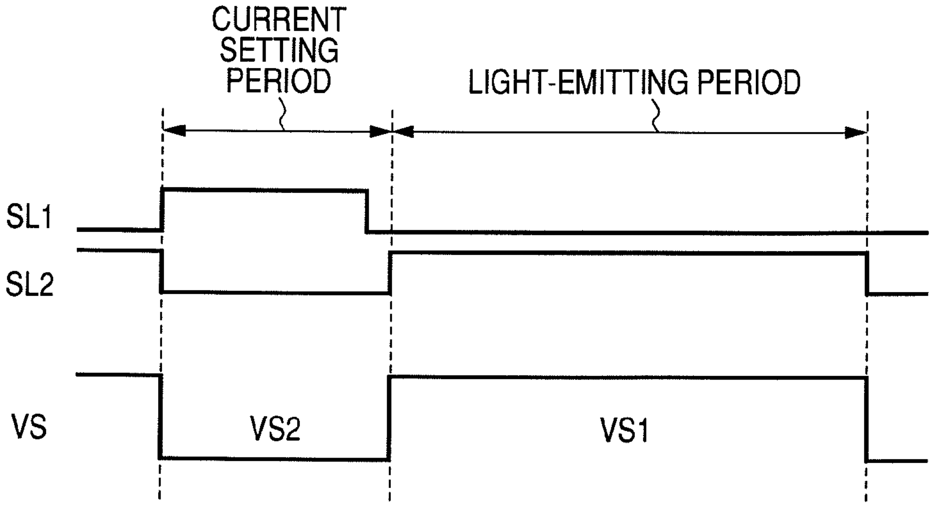
FIG. 13 is a timing chart in a six embodiment.

Note that, in this embodiment, the power supply line VS is not fixed at the voltage VS1 and has either one of the value of the voltages VS1 and VS2 (corresponds to the unit for changing the drain terminal voltage of the D-TFT). FIG. 13 is a timing chart illustrating an operation in this embodiment and the operation is described later.

The voltage signal SV1 of the first scanning line SL1 is set to the H level. The voltage signal SV2 of the second scanning line SL2 is set to the L level. The voltage VS2 is set for the power supply line VS. For this period (hereinafter, referred to as voltage writing period), the TFT1 and the TFT3 are in the on-state (ON) and the TFT2 and TFT4 are in the off-state (OFF). For this period, each of the gate terminal voltage and the drain terminal voltage of the D-TFT is equal to the voltage VS2 of the power supply line VS. When the threshold voltage of the D-TFT is expressed as Vt, the source terminal voltage of the D-TFT is equal to "VS2−Vt". A voltage of the other end (end which is not connected with the source terminal of the D-TFT) of the capacitor element C is equal to the control voltage VD of the data line DL. As a result, a voltage "VD−VS2+Vt" is held between both ends of the capacitor element C.

In this embodiment, the voltage writing period corresponds to the current setting period for setting the current supplied to the OLED.

After that, the voltage signal SV1 of the first scanning line SL1 is set to the L level. The voltage signal SV2 of the second scanning line SL2 is set to the H level. The voltage VS1 is set for the power supply line VS. For this period (hereinafter, referred to as light-emitting period), the TFT1 and the TFT3 are turned OFF, the TFT2 and TFT4 are turned ON. For this period, even when the source terminal voltage of the D-TFT varies, a voltage difference between the gate terminal and the source terminal of the D-TFT is held to "VD−VS2+Vt" by a charge pump effect.

In other words, in this embodiment, a voltage determined based on the voltage (VS2) of the drain terminal of the driving transistor and the control voltage (VD) supplied from the data line during the current setting period is equal to a voltage "VD−VS2".

Therefore, a voltage difference (Vg−Vs) between the gate terminal and the source terminal of the driving transistor is equal to a voltage obtained by summing up the threshold voltage (Vt) of the driving transistor and the voltage determined based on the voltage of the drain terminal of the driving transistor during the current setting period and the control voltage supplied from the data line, that is, "Vg−Vs=VD−VS2+Vt". Note that Vg indicates the gate terminal voltage of the D-TFT and Vs indicates the source terminal voltage of the D-TFT.

Voltages are set such that VS1 is larger than VS2 and the D-TFT operates in the saturation region. At this time, the current ID expressed by the following expression is supplied from the D-TFT to the OLED.

$$ID=0.5\times\beta\times(Vg-Vs-Vt)^2=0.5\times\beta\times(VD-VS2)^2$$

Note that β denotes a parameter indicating the current capability of the D-TFT, which depends on the mobility, gate capacitance, and size of the D-TFT. Therefore, the current ID can be controlled based on the control voltage VD of the data line DL. The OLED emits light at a luminance corresponding to the supplied current ID based on the current-luminance characteristic.

In the display operation of the OLED display, for example, the above-mentioned operation is performed on the pixels belonging to the same row at the same time and successively performed for all rows to display a screen image. A display period of a screen image is called a frame. The frame is repeated every 1/60 seconds to change display, thereby displaying an image.

In this embodiment, the same effect as described in the fifth embodiment is obtained. Because VS2 is low, even when the control voltage VD of the data line DL is lower than the control voltage in the fifth embodiment, the same current can be supplied. Therefore, the power consumption of a circuit for applying the control voltage VD of the data line DL and the power consumption of the entire display device can be suppressed.

The voltage VS2 is set to a value equal to or smaller than the threshold voltage at which the OLED into which the current flows emits light. In this case, the same operation can be performed even when the TFT4 is not provided. Therefore, the same effect is obtained with a small number of elements.

Seventh Embodiment

Figure 14:
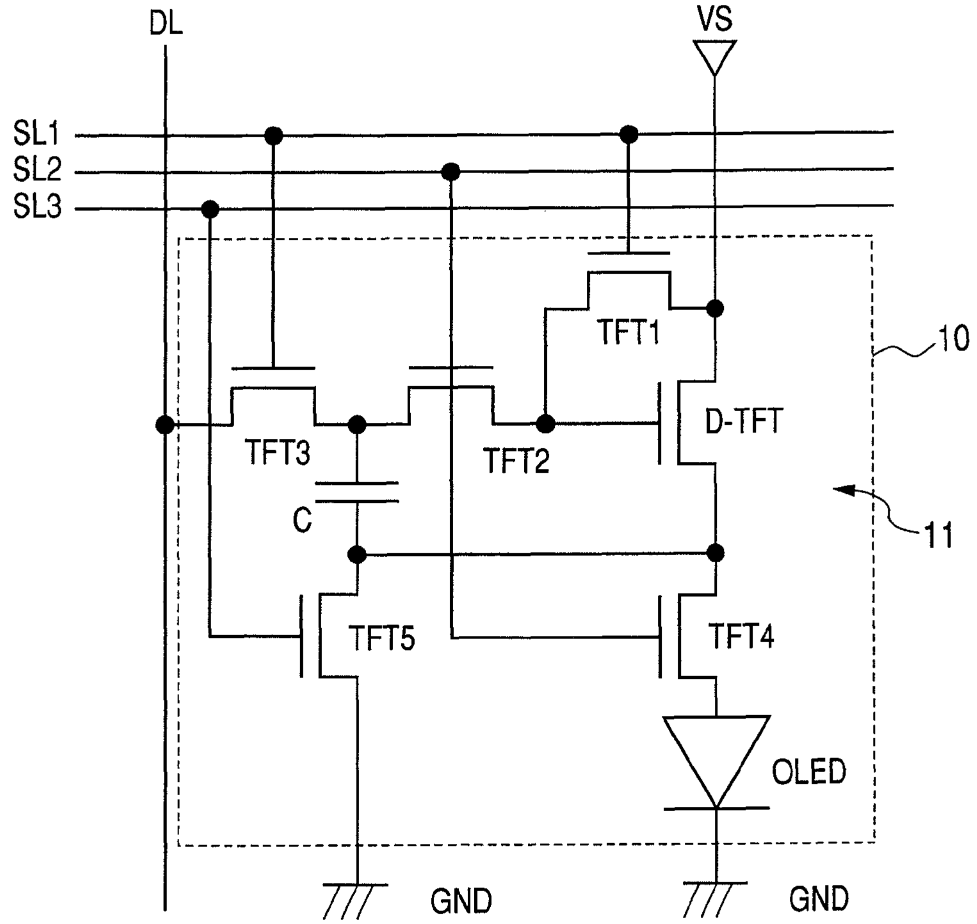
FIG. 14 is a circuit diagram illustrating an explanatory structure for an operation of a light-emitting display device according to a seventh embodiment.

FIG. 14 illustrates a pixel structure of a light-emitting display device using an OLED element according to a seventh embodiment of the present invention. The description of the same constituent elements as the fifth embodiment is simplified or omitted.

The OLED display according to this embodiment has each pixel 10 which includes an OLED element whose cathode terminal is connected (grounded) with a GND (ground) line (hereinafter, referred to as GND) and a drive circuit 11 connected with an anode terminal of the OLED.

The drive circuit 11 includes a driving transistor having a gate terminal, a source terminal, and a drain terminal, for driving the OLED, a capacitor element C whose one end is connected with a source terminal of a D-TFT, and multiple switch elements.

The driving transistor includes an n-type TFT (hereinafter, referred to as D-TFT). The drain terminal of the D-TFT is connected with a power supply line VS.

The multiple switch elements include first to fifth switch elements.

The first switch element is comprised of an n-type TFT (hereinafter, referred to as TFT1). One of the source and drain terminals of the TFT1 is connected with the drain terminal of the D-TFT and the other of the source and drain terminals thereof is connected with the gate terminal of the D-TFT.

The second switch element is comprised of an n-type TFT (hereinafter, referred to as TFT2). One of the source and drain terminals of the TFT2 is connected with the gate terminal of the D-TFT and the other of the source and drain terminals thereof is connected with the other end (end which is not connected with the source terminal of the D-TFT) of the capacitor element C.

The third switch element is comprised of an n-type TFT (hereinafter, referred to as TFT3) One of the source and drain terminals of the TFT3 is connected with a data line DL and the other of the source and drain terminals thereof is connected with the other end (end which is not connected with the source terminal of the D-TFT) of the capacitor element C.

The fourth switch element is comprised of an n-type TFT (hereinafter, referred to as TFT4). One of the source and drain terminals of the TFT4 is connected with the source terminal of the D-TFT and the other of the source and drain terminals thereof is connected with an anode terminal of the OLED.

The fifth switch element is comprised of an n-type TFT (hereinafter, referred to as TFT5). One of the source and drain terminals of the TFT5 is connected with the source terminal of the D-TFT and the other of the source and drain terminals thereof is connected (grounded) with the GND.

The OLED display further includes, in addition to the GND, a data line DL, first to third scanning lines SL1 to SL3, and a power supply line VS. The data line DL is used to supply the control voltage VD for controlling the current supplied from the D-TFT to the OLED. The power supply line VS is used to supply the voltage VS1. The first scanning line SL1 is connected with the gate terminal of the TFT1 and the gate terminal of the TFT3 to supply the voltage signal SV1 thereto.

The second scanning line SL2 is connected with the gate terminal of the TFT2 and the gate terminal of the TFT4 to supply the voltage signal SV2 thereto. The third scanning line SL3 is connected with the gate terminal of the TFT5 to supply the voltage signal SV3 thereto.

When the current is to be supplied to the OLED, the voltage VS1 of the power line VS is set to such a voltage that the D-TFT operates in a saturation region. In addition, a capacitance value of the capacitor element C is set to a value equal to or larger than three times a sum of parasitic capacitances including an overlap capacitance with respect to the D-TFT.

Figure 15:
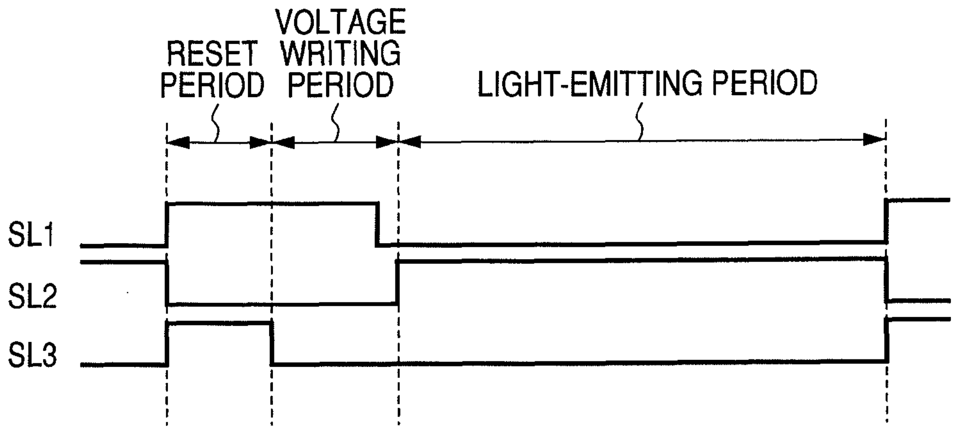
FIG. 15 is an explanatory timing chart illustrating the operation in the seventh embodiment.

FIG. 15 is a timing chart illustrating an operation in this embodiment, which will be described below.

The voltage signal SV1 of the first scanning line SL1 is set to an H level. The voltage signal SV2 of the second scanning line SL2 is set to an L level. The voltage signal SV3 of the third scanning line SL3 is set to the H level. The voltage VS1 is set for the power supply line VS. For this period (hereinafter, referred to as reset period), the TFT1 and the TFT3 are turned ON, the TFT2 and TFT4 are turned OFF, and the TFT5 is turned ON. For this period, the source terminal voltage of the D-TFT is equal to the GND.

Subsequently, the voltage signal SV1 of the first scanning line SL1 is set to the H level. The voltage signal SV2 of the second scanning line SL2 is set to the L level. The voltage signal SV3 of the third scanning line SL3 is set to the L level. For this period (hereinafter, referred to as voltage writing period), the TFT1 and the TFT3 are turned ON, the TFT2 and TFT4 are turned OFF, and the TFT5 is turned OFF. For this period, the source terminal voltage of the D-TFT is equal to "VS1−Vt" when the threshold voltage of the D-TFT is expressed as Vt. A voltage of the other end (end which is not connected with the source terminal of the D-TFT) of the capacitor element C is equal to the control voltage VD of the data line DL. As a result, the voltage difference "VD−VS1+Vt" is held between both ends of the capacitor element C.

In this embodiment, a period obtained by adding the reset period and the voltage writing period corresponds to the current setting period for setting the current supplied to the OLED.

After that, the voltage signal SV1 of the first scanning line SL1 is set to the L level. The voltage signal SV2 of the second scanning line SL2 is set to the H level. The voltage signal SV3 of the third scanning line SL3 is set to the L level. For this period (hereinafter, referred to as light-emitting period), the TFT1 and the TFT3 are turned OFF, the TFT2 and TFT4 are turned ON, and the TFT5 is turned OFF. For this period, even when the source terminal voltage of the D-TFT varies, a voltage difference between the gate terminal and the source terminal of the D-TFT is held to "VD−VS1+Vt" by a charge pump effect.

In other words, in this embodiment, a voltage determined based on the voltage (VS1) of the drain terminal of the driving transistor and the control voltage (VD) supplied from the data line during the current setting period is equal to a voltage "VD−VS1".

Therefore, a voltage difference "Vg−Vs" between the gate terminal and the source terminal of the driving transistor is equal to a voltage obtained by summing up the threshold voltage (Vt) of the driving transistor and the voltage determined based on the voltage of the drain terminal of the driving transistor during the current setting period and the control voltage supplied from the data line, that is, "Vg−Vs=VD−VS1+Vt". Note that Vg indicates the gate terminal voltage of the D-TFT and Vs indicates the source terminal voltage of the D-TFT.

Voltages are set such that the voltage VS1 of the power supply line VS is sufficiently high, and the D-TFT operates in the saturation region.

At this time, a current ID expressed by the following expression is supplied from the D-TFT to the OLED.

$$ID=0.5\times\beta\times(Vg-VS-Vt)^2=0.5\times\beta\times(VD-VS1)^2$$

Note that β denotes a parameter indicating the current capability of the D-TFT, which depends on the mobility, gate capacitance, and size of the D-TFT. Therefore, the current ID can be controlled based on the control voltage VD of the data line DL. The OLED emits light at luminance corresponding to the supplied current ID based on the current-luminance characteristic.

In the display operation of the OLED display, for example, the above-mentioned operation is performed on the pixels belonging to the same row at the same time and successively performed for all rows to display a screen image. A display period of a screen image is called a frame. The frame is repeated every 1/60 seconds to change display, thereby displaying an image.

In this embodiment, the reset period is provided. Therefore, even when the source terminal voltage of the D-TFT becomes higher than the voltage of the power supply line VS by the influence of a noise or the like, the operation can be normally performed. In this embodiment, the same effect as the first embodiment of the present invention is obtained. The same operation as the sixth embodiment of the present invention can also be realized.

Eighth Embodiment

Figure 16:
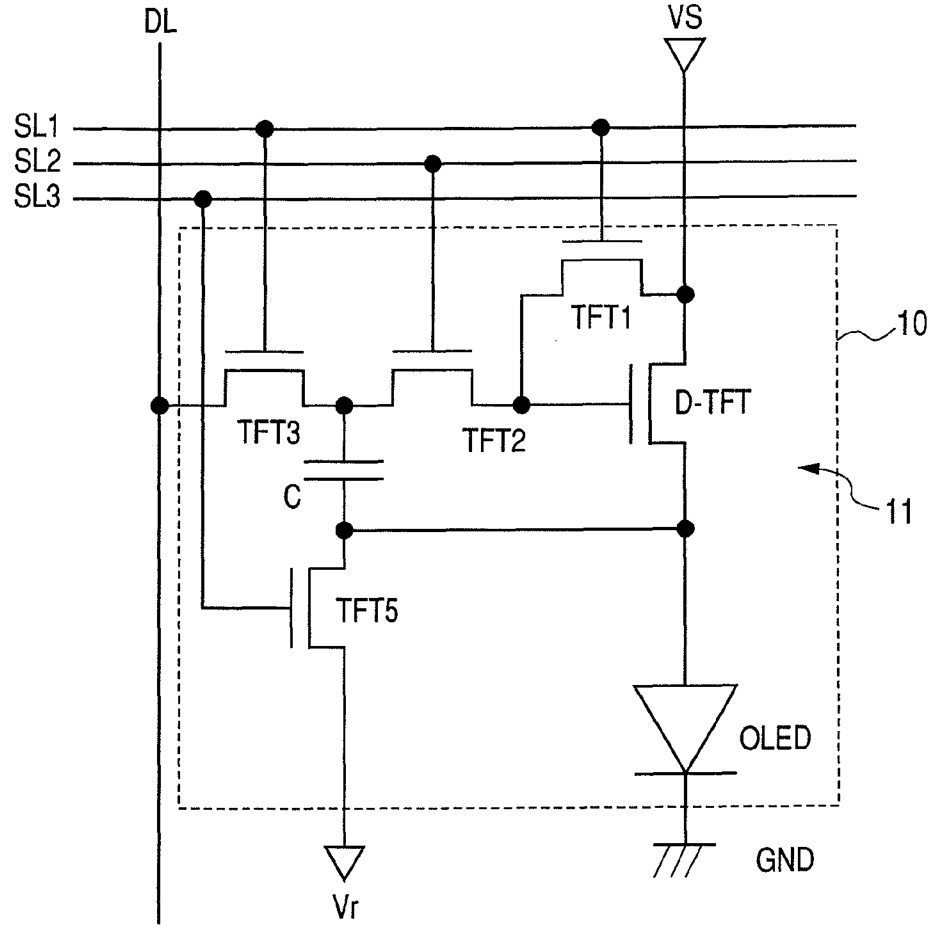
FIG. 16 is a circuit diagram illustrating a structure of a light-emitting display device according to an eighth embodiment.

FIG. 16 illustrates a pixel structure of a light-emitting display device using an OLED element according to an eighth embodiment of the present invention. The description of the same constituent elements as the fifth embodiment of the present invention is simplified or omitted.

The OLED display according to this embodiment has each pixel 10 which includes an OLED element whose cathode terminal is connected with a GND (ground) line (hereinafter, referred to as GND) (grounded) and a drive circuit 11 connected with an anode terminal of the OLED.

The drive circuit 11 includes a driving transistor having a gate terminal, a source terminal, and a drain terminal, for driving the OLED, a capacitor element C whose one end is connected with a source terminal of a D-TFT, and multiple switch elements.

The driving transistor includes an n-type TFT (hereinafter, referred to as D-TFT). The drain terminal of the D-TFT is connected with a power supply line VS.

The multiple switch elements include first to fifth switch elements (excluding fourth switch element).

The first switch element is comprised of an n-type TFT (hereinafter, referred to as TFT1). One of the source and drain terminals of the TFT1 is connected with the drain terminal of the D-TFT and the other of the source and drain terminals thereof is connected with the gate terminal of the D-TFT.

The second switch element is comprised of an n-type TFT (hereinafter, referred to as TFT2). One of the source and drain terminals of the TFT2 is connected with the gate terminal of the D-TFT and the other of the source and drain terminals thereof is connected with the other end (end which is not connected with the source terminal of the D-TFT) of the capacitor element C.

The third switch element is comprised of an n-type TFT (hereinafter, referred to as TFT3). One of the source and drain terminals of the TFT3 is connected with a data line DL and the other of the source and drain terminals thereof is connected with the other end which is not connected with the source terminal of the D-TFT of the capacitor element C.

The fifth switch element is comprised of an n-type TFT (hereinafter, referred to as TFT5). One of the source and drain terminals of the TFT5 is connected with the source terminal of the D-TFT and the other of the source and drain terminals thereof is connected with a second power supply line Vr.

The OLED display further includes, in addition to the GND, a data line DL, a first power supply line VS, a second power supply line Vr, first to third scanning lines SL1 to SL3. The data line DL is used to supply the control voltage VD for controlling the current supplied from the D-TFT to the OLED. The first power supply line VS is used to supply the voltages VS1 and VS2. The second power supply line Vr is used to supply the reference voltage Vref. The first scanning line SL1 is connected with the gate terminal of the TFT1 and the gate terminal of the TFT3 to supply the voltage signal SV1 thereto. The second scanning line SL2 is connected with the gate terminal of the TFT2 to supply the voltage signal SV2 thereto. The third scanning line SL3 is connected with the gate terminal of the TFT5 to supply the voltage signal SV3 thereto.

One of the voltages VS1 and VS2 is applied from the first power supply line VS for each period. The voltage VS1 is set to such a voltage that the D-TFT operates in the saturation region when the current is supplied to the OLED. The voltage VS2 is set to a voltage equal to or smaller than a driving voltage of the OLED. When the threshold voltage of the D-TFT is expressed as Vt, the reference voltage Vref of the second power supply line Vr is set to a value equal to or smaller than "VS2−Vt". The capacitance value of the capacitor element C is set to a value equal to or larger than three times a sum of the channel capacitance of the D-TFT and a parasitic capacitance such as an overlap capacitance.

Figure 17:
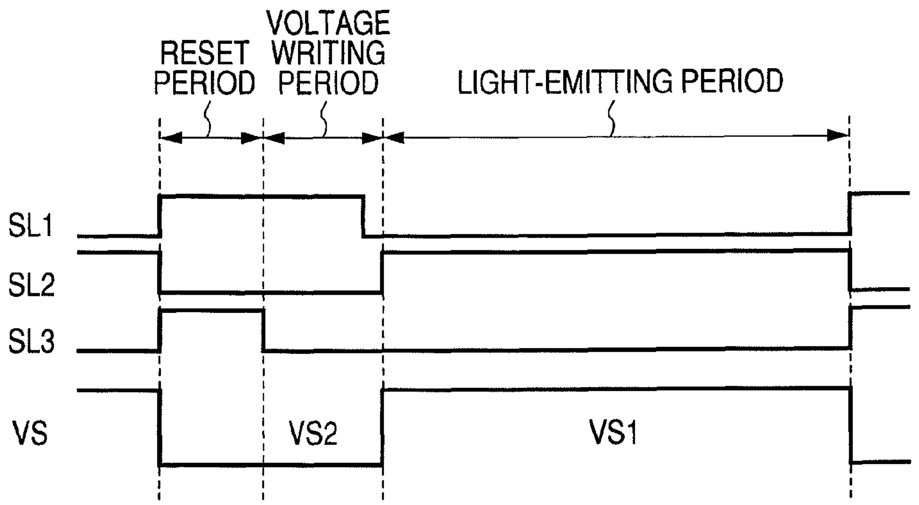
FIG. 17 is an explanatory timing chart illustrating an operation in the eighth embodiment.

FIG. 17 is a timing chart illustrating an operation in this embodiment, which will be described below.

The voltage signal SV1 of the first scanning line SL1 is set to an H level. The voltage signal SV2 of the second scanning line SL2 is set to an L level. The voltage signal SV3 of the third scanning line SL3 is set to the H level. The voltage VS2 is set for the first power supply line VS. For this period (hereinafter, referred to as reset period), the TFT1 and the TFT3 are turned ON, the TFT2 is turned OFF, and the TFT5 is turned ON. For this period, the source terminal voltage of the D-TFT is equal to the reference voltage Vref of the second power supply line Vr.

Subsequently, the voltage signal SV1 of the first scanning line SL1 is set to the H level. The voltage signal SV2 of the second scanning line SL2 is set to the L level. The voltage signal SV3 of the third scanning line SL3 is set to the L level. The voltage VS2 is set for the first power supply line VS. For this period (hereinafter, referred to as voltage writing period), the TFT1 and the TFT3 are turned ON, the TFT2 is turned OFF, and the TFT5 is turned OFF. For this period, the voltage VS2 of the first power supply line VS is equal to or smaller than the driving voltage of the OLED, so the current does not flow into the OLED. Therefore, the source terminal voltage of the D-TFT is equal to "VS2−Vt". A voltage of the other end (end which is not connected with the source terminal of the D-TFT) of the capacitor element C is equal to the control voltage VD of the data line DL. As a result, the voltage difference "VD−VS2+Vt" is held between both ends of the capacitor element C.

In this embodiment, a period obtained by adding the reset period and the voltage writing period corresponds to the current setting period for setting the current supplied to the OLED.

After that, the SV1 of the first scanning line SL1 is set to the L level. The SV2 of the second scanning line SL2 is set to the H level. The SV3 of the third scanning line SL3 is set to the L level. The voltage VS1 is set for the first power supply line VS. For this period (hereinafter, referred to as light-emitting period), the TFT1 and the TFT3 are turned OFF, the TFT2 is turned ON, and the TFT5 is turned OFF. For this period, even when the source terminal voltage of the D-TFT varies, a voltage difference between the gate terminal and the source terminal of the D-TFT is held to "VD−VS2+Vt" by a charge pump effect.

In other words, in this embodiment, a voltage determined based on the voltage (VS2) of the drain terminal of the driving transistor and the control voltage (VD) supplied from the data line during the current setting period is equal to a voltage "VD−VS2".

Therefore, a voltage difference (Vg−Vs) between the gate terminal and the source terminal of the driving transistor is equal to a voltage obtained by summing up the threshold voltage (Vt) of the driving transistor and the voltage determined based on the voltage of the drain terminal of the driving transistor during the current setting period and the control voltage supplied from the data line, that is, "Vg−Vs=VD−VS2+Vt". Note that Vg indicates the gate terminal voltage of the D-TFT and Vs indicates the source terminal voltage of the D-TFT.

Voltages are set such that the voltage VS1 of the first power supply line VS is sufficiently high, and the D-TFT operates in the saturation region.

At this time, a current ID expressed by the following expression is supplied from the D-TFT to the OLED.

$$ID=0.5\times\beta\times(Vg-Vs-Vt)^2=0.5\times\beta\times(VD-VS2)^2$$

Note that β denotes a parameter indicating the current capability of the D-TFT, which depends on the mobility, gate capacitance, and size of the D-TFT. Therefore, the current ID can be controlled based on the control voltage VD of the data line DL. The OLED emits light at luminance corresponding to the supplied current ID based on the current-luminance characteristic.

In the display operation of the OLED display, for example, the above-mentioned operation is performed on the pixels belonging to the same row at the same time and successively performed for all rows to display a screen image. A display period of a screen image is called a frame. The frame is repeated every 1/60 seconds to change display, thereby displaying an image.

In this embodiment, the reset period is provided. Therefore, even when the source terminal voltage of the D-TFT becomes higher than the voltage of the first power supply line VS by the influence of a noise or the like, the operation can be normally performed. In this embodiment, the same effect as the fifth embodiment of the present invention is obtained. The same operation as the sixth embodiment of the present invention can also be realized. As in the sixth embodiment of the present invention, because the voltage VS2 of the power supply line VS is low, even when the control voltage VD of the data line DL is lower than the control voltage of the first embodiment of the present invention, the same current can be supplied. Thus, the power consumption of a circuit for applying the control voltage VD of the data line DL and the power consumption of the entire display device can be suppressed.

According to the fifth embodiment to the eighth embodiment of the present invention, for the current setting period, the capacitor element C of the drive circuit included in the pixel holds a sum of the threshold voltage of the D-TFT and the voltage for setting the current supplied to the OLED between the gate terminal and the source terminal of the D-TFT. Therefore, the current supplied to the OLED can be set without depending on the threshold voltage of the D-TFT.

The number of capacitor elements C included in the drive circuit is one and thus a problem with respect to the precision of the capacitance ratio does not occur.

The capacitance value of the capacitor element is a sufficient large value equal to or larger than three times a parasitic capacitance, so the influence of a parasitic capacitor is small. Therefore, the current can be supplied to the OLED with high precision.

As described above, according to this embodiment, the current supplied to the OLED is set based on the voltage, so the present invention can be applied to a large-size and high-definition light-emitting display device whose load is large.

Further, according to this embodiment, a structure can be employed in which the drive circuit includes only the n-type TFTs, the anode of the OLED is provided on the drive circuit side, and an anode electrode, a light-emitting layer made of an organic material, and a cathode electrode are layered in the stated order from the lower side.

Further, according to this embodiment, an n-type TFT whose channel layer is an amorphous metal oxide semiconductor layer having a carrier density equal to or smaller than $10^{18}$ ($cm^{-3}$) and a field effect mobility equal to or larger than 1 ($cm^2/Vs$) is used as the n-type TFT. Therefore, as compared with the case of a structure using the a-Si or OS TFT, it is possible to produce a light-emitting display device using a TFT which has low power consumption and can be formed at room temperature. Because of high mobility, a necessary TFT size is small, so high definition can be realized.

Further, according to this embodiment, the n-type TFT whose channel layer is the amorphous metal oxide semiconductor layer is used. Therefore, because of the amorphous layer, it is possible to produce a TFT whose flatness is high and variations in characteristics are small.

The present invention can be used for a light-emitting display device using a light-emitting display element. In particular, the present invention can be applied to a light-emitting display device in which pixels, each of which includes an OLED element and a drive circuit for supplying current to the OLED element, are arranged in matrix.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-342578, filed Dec. 20, 2006, which is hereby incorporated by reference herein in its entirety.

The invention claimed is:

1. A light-emitting display device comprising multiple pixels, the pixels each including:

a light-emitting element which has an anode terminal and a cathode terminal and emits light at a luminance determined based on a current to be supplied; and a drive circuit for supplying the current to the light-emitting element based on a control voltage supplied from a data line, the drive circuit including:

a driving transistor having a gate terminal, a source terminal, and a drain terminal, for driving the light-emitting element;

a capacitor element having a first end connected with the gate terminal of the driving transistor and a second end;

a first switch element for electrically connecting or disconnecting the gate terminal and the source terminal of the driving transistor;

a second switch element for electrically connecting or disconnecting the source terminal of the driving transistor and the second end of the capacitor element; and a third switch element for electrically connecting or disconnecting the data line and the second end of the capacitor element, wherein in a light-emitting period, the second end of the capacitor element is connected with the source terminal by the second switch element and the drive circuit supplies a current to the light-emitting element; and in a current setting period prior to the light-emitting period, during which the gate terminal is connected with the source terminal by the first switch element and the second end of the capacitor element is connected with the data line by the third switch element, the source terminal of the driving transistor is once connected with a reference voltage line having a voltage higher than a voltage of the drain terminal, and thereafter the source terminal of the driving transistor is disconnected from the reference voltage line to render the voltage between the gate terminal and the drain terminal equal to a threshold voltage of the driving transistor.

2. A light-emitting display device according to claim 1, wherein the voltage difference between the first end and the second end of the capacitor element is equal to the voltage of the drain terminal added by the threshold voltage of the driving transistor subtracted by the control voltage.

3. A light-emitting display device according to claim 1, wherein the drive circuit further includes a fourth switch element for electrically connecting or disconnecting the source terminal of the driving transistor and a reference voltage line or the source terminal of the driving transistor and the drain terminal thereof.

4. A light-emitting display device according to claim 3, wherein the drive circuit further includes a fifth switch element for electrically connecting or disconnecting the source terminal of the driving transistor and one end of the light-emitting element.

5. A light-emitting display device according to claim 1, further comprising a unit for changing the voltage of the drain terminal of the driving transistor.

6. A light-emitting display device according to claim 1, wherein the driving transistor and the multiple switch elements are thin film transistors.

7. A light-emitting display device according to claim 6, wherein the driving transistor and the multiple switch elements are n-type thin film transistors.

8. A light-emitting display device according to claim 1, wherein the light-emitting element is an OLED element.

9. A light-emitting display device according to claim 7, wherein the n-type thin film transistor of the drive circuit includes an amorphous metal oxide semiconductor film having a carrier density equal to or smaller than $10^{18}$ ($cm^3$), which is used as a channel layer of the n-type thin film transistor, and has a mobility equal to or larger than 1 (cm2/Vs) and an on/off ratio equal to or larger than $10^6$.

* * * * *